United States Patent
Nishioka

(10) Patent No.: US 8,660,125 B2
(45) Date of Patent: Feb. 25, 2014

(54) NODE DEVICE, INTEGRATED CIRCUIT AND CONTROL METHOD IN RING TRANSMISSION SYSTEM

(75) Inventor: Shinichiro Nishioka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 211 days.

(21) Appl. No.: 13/386,756

(22) PCT Filed: May 24, 2011

(86) PCT No.: PCT/JP2011/002892
§ 371 (c)(1),
(2), (4) Date: Jan. 24, 2012

(87) PCT Pub. No.: WO2011/148621
PCT Pub. Date: Dec. 1, 2011

(65) Prior Publication Data
US 2012/0120960 A1 May 17, 2012

(30) Foreign Application Priority Data

May 27, 2010 (JP) ................................. 2010-121091

(51) Int. Cl.
*H04L 12/56* (2011.01)
*H04L 12/427* (2006.01)

(52) U.S. Cl.
USPC ........... 370/392; 370/217; 370/222; 370/224; 370/405; 370/406; 709/239

(58) Field of Classification Search
USPC ................. 370/216–228, 392, 403–406, 424; 709/239
See application file for complete search history.

(56) References Cited

U.S. PATENT DOCUMENTS

| | | | |
|---|---|---|---|
| 5,530,694 A | 6/1996 | Guezou et al. | |
| 7,307,947 B2 * | 12/2007 | Okuno | 370/222 |
| 7,983,177 B2 * | 7/2011 | Nakamura | 370/249 |
| 8,050,183 B2 * | 11/2011 | Florit et al. | 370/248 |
| 2002/0159552 A1 * | 10/2002 | Shin et al. | 375/354 |
| 2005/0027876 A1 * | 2/2005 | Umei et al. | 709/231 |
| 2007/0143328 A1 * | 6/2007 | Green et al. | 707/101 |

FOREIGN PATENT DOCUMENTS

| | | |
|---|---|---|
| JP | 6-209326 | 7/1994 |
| JP | 2005-65216 | 3/2005 |

OTHER PUBLICATIONS

International Search Report issued Jun. 21, 2011 in International (PCT) Application No. PCT/JP2011/002892.

* cited by examiner

*Primary Examiner* — Andrew Chriss
*Assistant Examiner* — Romani Ohri
(74) *Attorney, Agent, or Firm* — Wenderoth, Lind & Ponack, L.L.P.

(57) ABSTRACT

A node device in a ring transmission system in which a plurality of node devices are connected as a ring via serial links has a PHY transitioning between a normal mode and a loopback mode with timing that maintains symbol lock between an idle frame transmitted to a later serial link in the normal mode according a transmission instruction, and an idle frame from an earlier node device looped back for output to a later serial link during the loopback mode, thus performing relay processing on non-locally addressed data packets during the loopback mode.

16 Claims, 22 Drawing Sheets

FIG. 3A  Control command packet
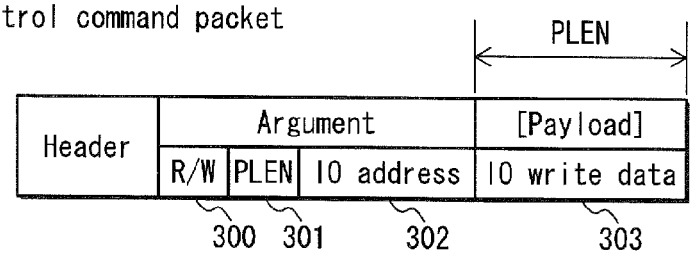
FIG. 3B  Data command packet
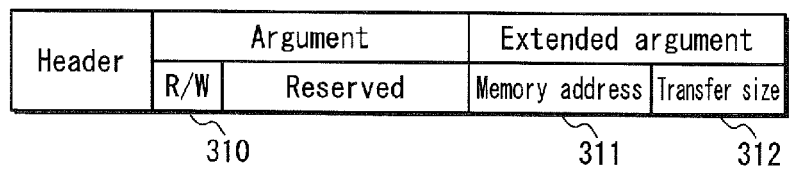
FIG. 3C  Response packet
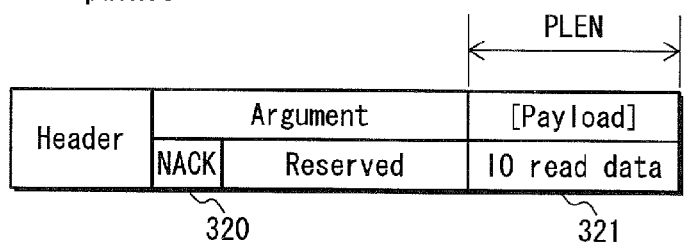
FIG. 3D  Data packet
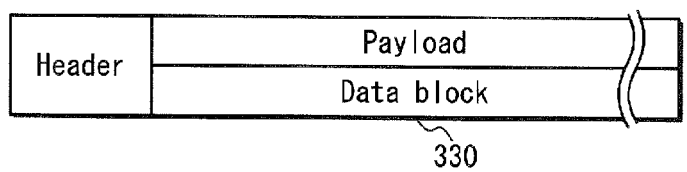
FIG. 3E  Message packet
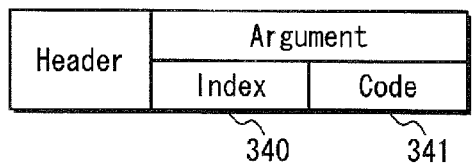
Index
- Flow control request (FCREQ)
- Flow control ready (FCRDY)
- Status (STAT)
- Other

FIG. 4

| Symbol name | Mnemonic | Function | Source data (hexadecimal) | Code symbol (binary) | |
|---|---|---|---|---|---|
| | | | | Current RD − | Current RD + |
| K28.0 | SDB | Start of data Burst | 1C | 001111 0100 | 110000 1011 |
| K28.1 | SOP | Start of Packet | 3C | 001111 1001 | 110000 0110 |
| K28.2 | – | – | 5C | 001111 0101 | 110000 1010 |
| K28.3 | LIDL | Logical Idle | 7C | 001111 0011 | 110000 1100 |
| K28.4 | – | – | 9C | 001111 0010 | 110000 1101 |
| K28.5 | COM | Comma | BC | 001111 1010 | 110000 0101 |
| K28.6 | DIDL | Data Idle | DC | 001111 0110 | 110000 1001 |
| K28.7 | – | – | FC | 001111 1000 | 110000 0111 |
| K23.7 | – | – | F7 | 111010 1000 | 000101 0111 |
| K27.7 | EDB | End of Data Burst | FB | 110110 1000 | 001001 0111 |
| K29.7 | EOP | End of packet | FD | 101110 1000 | 010001 0111 |
| K30.7 | – | – | FE | 011110 1000 | 100001 0111 |

FIG. 5

| Control symbol set name | First symbol | Second symbol |
|---|---|---|
| SOP | COM (K28.5) | SOP (K28.1) |
| EOP | | EOP (K29.7) |
| SDB | | SDB (K28.0) |
| EDB | | EDB (K27.7) |
| LIDL | | LIDL (K28.3) |
| DIDL | | DIDL (K28.6) |
| SYN | | D31.5 |

Packet framing rule

Data burst framing rule

FIG. 21

| Control symbol set name | First symbol | Second symbol |
|---|---|---|
| SOP | | SOP (K28.1) |
| EOP | | EOP (K29.7) |
| SDB | | SDB (K28.0) |
| EDB | COM (K28.5) | EDB (K27.7) |
| LIDL | | LIDL0 (K28.3) |
| | | LIDL1 (D16.7) |
| DIDL | | DIDL0 (K28.6) |
| | | DIDL1 (D12.2) |
| SYN | | D31.5 |

NODE DEVICE, INTEGRATED CIRCUIT AND CONTROL METHOD IN RING TRANSMISSION SYSTEM

TECHNICAL FIELD

The present invention relates to data transfer technology between node devices or between integrated circuits connected in a ring through serial links.

BACKGROUND ART

In recent years, as advances in semiconductor miniaturization and acceleration are made, there is a growing tendency for ever-greater amounts of data to be communicated between devices, or between LSI circuits equipped on a device. However, the influence of packaging overhead imposes a strict limit on the number of LSI terminals (pads). As such, in order to realize greater data transfer speeds with a reduced number of LSI terminals, interface standards making use of serial transfer have become widespread.

Generally, bus connections are difficult to achieve for serial transfers. One possible solution is using ring topology in order to connect a plurality of node devices. In ring topology, any node device (i.e., repeater) connected between the node device serving as the data transmission source and the destination node device must remain active in order to perform data relay processing. Thus, conventional technology for reducing the electric power consumption of node devices serving as repeaters has the logical layer (link controller), being unnecessary for relay processing, maintain a reset state, while the physical layer (PHY) performs the relay processing. Patent Literature 1 discloses an example of such technology.

CITATION LIST

Patent Literature

[Patent Literature 1]
Japanese Patent Application Publication No. 2005-065216

SUMMARY OF INVENTION

Technical Problem

However, the node device according to the above-described conventional technology must maintain the reset state of the logical layer (link controller) while the physical layer (PHY) performs the relay processing. Therefore, a problem arises in that, when processing involving the logical layer (link controller) resumes, the node device must undo the reset and perform initialization processing. This leads to processing overhead. Also, data continuity is not maintained when the output is switched between the transmit data from the logical layer (link controller) and the data relayed by the physical layer (PHY). This results in increased processing overhead and decreased data transfer reliability as symbol lock must be re-established.

As such, the present invention aims to provide node devices, integrated circuits, and a control method for a ring transmission system in which data transfer reliability is maintained while decreasing processing overhead when performing relay processing.

Solution to Problem

In order to achieve the above-stated aim, the present invention provides a node device in a ring transmission system in which a plurality of node devices are connected as a ring through serial links, comprising: a link controller performing transmission, reception, and relay processing on a packet that includes destination information; and a PHY switching a communication mode of operation between (i) a normal mode of performing interconversion between serial data input and output via the serial links and parallel data handled by the link controller, and (ii) a loopback mode of looping back the serial data input via an earlier serial link, before handover to the link controller, for output to a later serial link, wherein the link controller includes: a symbol generator making an idle frame transmission instruction for maintaining symbol lock to the PHY during a pregap between a transmission request packet and a data packet; and a loopback controller making a transition instruction from the normal mode to the loopback mode to the PHY during the pregap and after the relay processing is performed in the normal mode on a transmission request packet addressed to another node device in order to cause a data packet addressed to the other node device to be looped back for output, during the normal mode, the PHY outputs an idle frame to the later serial link in accordance with the transmission instruction from the symbol generator, the PHY transitions from the normal mode to the loopback mode in accordance with the transition instruction with timing such that symbol lock is maintained between (i) the idle frame output to the later serial link in accordance with the transmission instruction during the normal mode, and (ii) an idle frame input from an earlier node device looped back for output to the later serial link during the loopback mode, and during the loopback mode, the PHY loops back the idle frame from the earlier node device for output to the later serial link, and performs the relay processing on the data packet addressed to the other node device.

An integrated circuit according to the present invention is in a ring transmission system in which a plurality of integrated circuit are connected as a ring through serial links, and comprises: a link controller performing transmission, reception, and relay processing on a packet that includes destination information; and a PHY switching a communication mode of operation between (i) a normal mode of performing interconversion between serial data input and output via the serial links and parallel data handled by the link controller, and (ii) a loopback mode of looping back the serial data input via an earlier serial link, before handover to the link controller, for output to a later serial link, wherein the link controller includes: a symbol generator making an idle frame transmission instruction for maintaining symbol lock to the PHY during a pregap between a transmission request packet and a data packet; and a loopback controller making a transition instruction from the normal mode to the loopback mode to the PHY during the pregap and after the relay processing is performed in the normal mode on a transmission request packet addressed to another integrated circuit in order to cause a data packet addressed to the other integrated circuit to be looped back for output, during the normal mode, the PHY outputs an idle frame to the later serial link in accordance with the transmission instruction from the symbol generator, the PHY transitions from the normal mode to the loopback mode in accordance with the transition instruction with timing such that symbol lock is maintained between (i) the idle frame output to the later serial link in accordance with the transmission instruction during the normal mode, and (ii) an idle frame input from an earlier integrated circuit looped back for output to the later serial link during the loopback mode, and during the loopback mode, the PHY loops back the idle frame from the earlier integrated circuit for output to the later serial link, and performs the relay processing on the data packet addressed to the other integrated circuit.

A control method according to the present invention controls a node device in a ring transmission system in which a plurality of node devices are connected as a ring through serial links, the node device comprising: a link controller performing transmission, reception, and relay processing on a packet that includes destination information; and a PHY switching a communication mode of operation between (i) a normal mode of performing interconversion between serial data input and output via the serial links and parallel data handled by the link controller, and (ii) a loopback mode of looping back the serial data input via an earlier serial link, before handover to the link controller, for output to a later serial link, wherein the link controller performing: a symbol generation step of making an idle frame transmission instruction for maintaining symbol lock to the PHY during a pregap between a transmission request packet and a data packet; and a loopback control step of making a transition instruction from the normal mode to the loopback mode to the PHY during the pregap and after the relay processing is performed in the normal mode on a transmission request packet addressed to another node device in order to cause a data packet addressed to the other node device to be looped back for output, during the normal mode, the PHY outputs an idle frame to the later serial link in accordance with the transmission instruction from the symbol generation step, the PHY transitions from the normal mode to the loopback mode in accordance with the transition instruction with timing such that symbol lock is maintained between (i) the idle frame output to the later serial link in accordance with the transmission instruction during the normal mode, and (ii) an idle frame input from an earlier node device looped back for output to the later serial link during the loopback mode, and during the loopback mode, the PHY loops back the idle frame from the earlier node device for output to the later serial link, and performs the relay processing on the data packet addressed to the other node device.

Advantageous Effects of Invention

According to the above-described node device, integrated circuit, and control method, relay processing can be achieved in which transition to the loopback mode is performed during a pregap preceding the data packet without maintaining the reset status for the link controller, data transfer reliability is improved, and processing overhead is reduced.

Alternatively, in the above-described node device, the link controller hands over a data sequence pertaining to a control symbol set conforming to 8b/10b that begins with a comma symbol for symbol lock and that includes an idle symbol to the PHY as the transmission instruction, the PHY outputs the idle frame during the normal mode through encoding of the data sequence pertaining to the control symbol set in conformity with 8b/10b, and the PHY transitions from the normal mode to the loopback mode in accordance with the transition instruction with timing such that (i) the idle frame output to the later serial link in accordance with the transmission instruction during the normal mode, and (ii) the idle frame from the earlier node device looped back for output to the later serial link during the loopback mode match in terms of comma symbol position and of running disparity.

Accordingly, when the PHY implements 8b/10b, the running disparity and symbol lock are dependably maintained before and after the transition to the loopback mode.

Further, in the above-described node device, the link controller hands over a data sequence in which are bundled a plurality of idle symbols of predetermined word length to the PHY as the transmission instruction, the PHY outputs the idle frame during the normal mode through encoding by (i) scrambling the data sequence according to a predetermined scrambling method (ii) and affixing a synchronization header to the head of each word of the predetermined word length for symbol lock, and the PHY transitions from the normal mode to the loopback mode in accordance with the transition instruction with timing such that (i) the idle frame output to the later serial link in accordance with the transmission instruction during the normal mode, and (ii) the idle frame from the earlier node device looped back for output to the later serial link during the loopback mode match in terms of synchronization header position.

Accordingly, when the PHY implements an encoding method such as 64b/66b involving scrambling and an affixed synchronization header, symbol lock is dependably maintained before and after the transition to the loopback mode.

Furthermore, in the above-described node device, the link controller hands over a data sequence pertaining to a control symbol set conforming to 8b/10b that begins with a comma symbol for symbol lock and that includes an idle symbol to the PHY as the transmission instruction, the PHY includes: an encoder generating and outputting the idle frame to be output to the later serial link during the normal mode through encoding of the data sequence pertaining to the control symbol set in conformity with 8b/10b; and a loopback selector selecting the idle frame output by the encoder for output to the later serial link during the normal mode, and selecting the idle frame from the earlier node device for output to the later serial link during the loopback mode, the comma symbol of the idle frame is exclusively a type of symbol having an unequal number of zeroes and ones, the idle symbol of the idle frame is a type of symbol having an unequal number of zeroes and ones, or is a type of symbol having an equal number of zeroes and ones, when the comma symbol input from the encoder and the comma symbol input from the earlier node device match in terms of running disparity, the loopback selector switches output so as to transition from the normal mode to the loopback mode immediately after the matching comma symbols, when the comma symbol input from the encoder and the comma symbol input from the earlier node device do not match in terms of running disparity, and an idle symbol following the comma symbol input from the encoder and an idle symbol following the comma symbol input from the earlier node device do not match in terms of symbol type, the loopback selector switches output so as to transition from the normal mode to the loopback mode immediately after the non-matching idle symbols, and when the comma symbol input from the encoder and the comma symbol input from the earlier node device do not match in terms of running disparity, and the idle symbol following the comma symbol input from the encoder and the idle symbol following the comma symbol input from the earlier node device match in terms of symbol type, the loopback selector replaces the idle symbol following the comma symbol output from the encoder with a different type of symbol such that the running disparity remains as-is, and switches output so as to transition from the normal mode to the loopback mode immediately after the matching idle symbols.

Accordingly, the running disparity and symbol lock are dependably maintained before and after the transition to the loopback mode, even when the running disparity of the comma symbols and idle symbols included in the idle frame is randomly switched.

Additionally, in the above-described node device, at initialization time, the link controller sets a power saving control of the PHY as active or inactive, and during a packet gap preceding the pregap, when the power saving control is active, the symbol generator makes a transmission disable instruction for placing the later serial link in an electrical idle state, and when the power saving control is inactive, the symbol generator makes another transmission instruction for maintaining symbol lock.

Accordingly, during the packet gap preceding the pregap, the device may select to reduce electrical power consumption by placing the serial link in an electrical idle state, or to reduce the latency of packet transmission and reception by continuing to transmit other idle symbols so as to maintain symbol lock.

The present invention also provides a node device in a ring transmission system in which a plurality of node devices are connected as a ring through serial links, comprising: a link controller performing transmission, reception, and relay processing on a packet that includes destination information; and a PHY switching a communication mode of operation between (i) a normal mode of performing interconversion between serial data input and output via the serial links and parallel data handled by the link controller, and (ii) a loopback mode of looping back the serial data input via an earlier serial link before handover to the link controller for output to a later serial link, wherein the link controller includes: a symbol generator making an idle frame transmission instruction to the PHY for maintaining symbol lock during a postgap following a data packet; and a loopback controller making a recovery instruction for recovering the normal mode from the loopback mode to the PHY during the postgap and after loopback and output of a data packet addressed to another node device are performed during the loopback mode, during the loopback mode, the PHY loops back an idle frame from an earlier node device to the later serial link for output, the PHY recovers the normal mode from the loopback mode in accordance with the recovery instruction with timing such that symbol lock is maintained between (i) the idle frame input from the earlier node device looped back for output to the later serial link during the loopback mode, and (ii) an idle frame output to the later serial link in accordance with the transmission instruction during the normal mode, and during the normal mode, the PHY outputs the idle frame to the later serial link in accordance with the transmission instruction from the symbol generator.

The present invention provides an integrated circuit in a ring transmission system in which a plurality of integrated circuits are connected as a ring through serial links, comprising: a link controller performing transmission, reception, and relay processing on a packet that includes destination information; and a PHY switching a communication mode of operation between (i) a normal mode of performing interconversion between serial data input and output via the serial links and parallel data handled by the link controller, and (ii) a loopback mode of looping back the serial data input via an earlier serial link before handover to the link controller for output to a later serial link, wherein the link controller includes: a symbol generator making an idle frame transmission instruction to the PHY for maintaining symbol lock during a postgap following a data packet; and a loopback controller making a recovery instruction for recovering the normal mode from the loopback mode to the PHY during the postgap and after loopback and output of a data packet addressed to another integrated circuit are performed during the loopback mode, during the loopback mode, the PHY loops back an idle frame from an earlier integrated circuit to the later serial link for output, the PHY recovers the normal mode from the loopback mode in accordance with the recovery instruction with timing such that symbol lock is maintained between (i) the idle frame input from the earlier integrated circuit looped back for output to the later serial link during the loopback mode, and (ii) an idle frame output to the later serial link in accordance with the transmission instruction during the normal mode, and during the normal mode, the PHY outputs the idle frame to the later serial link in accordance with the transmission instruction from the symbol generator.

The present invention provides a control method controlling a node device in a ring transmission system in which a plurality of node devices are connected as a ring through serial links, the node device comprising: a link controller performing transmission, reception, and relay processing on a packet that includes destination information; and a PHY switching a communication mode of operation between (i) a normal mode of performing interconversion between serial data input and output via the serial links and parallel data handled by the link controller, and (ii) a loopback mode of looping back the serial data input via an earlier serial link before handover to the link controller for output to a later serial link, wherein the link controller performing: a symbol generation step of making an idle frame transmission instruction to the PHY for maintaining symbol lock during a postgap following a data packet; and a loopback control step of making a recovery instruction for recovering the normal mode from the loopback mode to the PHY during the postgap and after loopback and output of a data packet addressed to another node device are performed during the loopback mode, during the loopback mode, the PHY loops back an idle frame from an earlier node device to the later serial link for output, the PHY recovers the normal mode from the loopback mode in accordance with the recovery instruction with timing such that symbol lock is maintained between (i) the idle frame input from the earlier node device looped back for output to the later serial link during the loopback mode, and (ii) an idle frame output to the later serial link in accordance with the transmission instruction during the normal mode, and during the normal mode, the PHY outputs the idle frame to the later serial link in accordance with the transmission instruction from the symbol generation step.

According to the above-described node device, integrated circuit, and control method, symbol lock is maintained for the idle frame when the normal mode is recovered during a postgap following the data packet.

In the above-described node device, the link controller hands over a data sequence pertaining to a control symbol set conforming to 8b/10b that begins with a comma symbol for symbol lock and that includes an idle symbol to the PHY as the transmission instruction, the PHY outputs the idle frame during the normal mode through encoding of the data sequence pertaining to the control symbol set in conformity with 8b/10b, and the PHY recovers the normal mode from the loopback mode in accordance with the recovery instruction with timing such that (i) the idle frame from the earlier node device looped back for output to the later serial link during the loopback mode, and (ii) the idle frame output to the later serial link in accordance with the transmission instruction during the normal mode match in terms of comma symbol position and of running disparity.

Accordingly, when the PHY implements 8b/10b, the running disparity and symbol lock are dependably maintained before and after the recovery of the normal mode.

Additionally, in above-described node device, the link controller hands over a data sequence in which are bundled a plurality of idle symbols of predetermined word length to the PHY as the transmission instruction, the PHY outputs the idle frame during the normal mode through encoding by (i) scrambling the data sequence according to a predetermined scrambling method and (ii) affixing a synchronization header to the head of each word of the predetermined word length for symbol lock, and the PHY recovers the normal mode from the loopback mode in accordance with the recovery instruction with timing such that (i) the idle frame from the earlier node device looped back for output to the later serial link during the loopback mode, and (ii) the idle frame output to the later serial link in accordance with the transmission instruction during the normal mode match in terms of synchronization header position.

Accordingly, when the PHY implements an encoding method such as 64b/66b involving scrambling and an affixed synchronization header, symbol lock is dependably maintained before and after the transition to the loopback mode.

Further, in the above-described node device, the link controller hands over a data sequence pertaining to a control symbol set conforming to 8b/10b that begins with a comma symbol for symbol lock and that includes an idle symbol to the PHY as the transmission instruction, the PHY includes: an encoder generating and outputting the idle frame to be output to the later serial link during the normal mode through encoding of the data sequence pertaining to the control symbol set in conformity with 8b/10b; and a loopback selector selecting the idle frame output by the encoder for output to the later serial link during the normal mode, and selecting the idle frame from the earlier node device for output to the later serial link during the loopback mode, the comma symbol of the idle frame is exclusively a type of symbol having an unequal number of zeroes and ones, the idle symbol of the idle frame is a type of symbol having an unequal number of zeroes and ones, or is a type of symbol having an equal number of zeroes and ones, when the comma symbol input from the earlier node device and the comma symbol input from the encoder match in terms of running disparity, the loopback selector switches output so as to recover the normal mode from the loopback mode immediately after the matching comma symbols, when the comma symbol input from the earlier node device and the comma symbol input from the encoder do not match in terms of running disparity, and an idle symbol following the comma symbol input from the earlier node device and an idle symbol following the comma symbol input from the encoder do not match in terms of symbol type, the loopback selector switches output so as to recover the normal mode from the loopback mode immediately after the non-matching idle symbols, and when the comma symbol input from the earlier node device and the comma symbol input from the encoder do not match in terms of running disparity, and the idle symbol following the comma symbol input from the earlier node device and the idle symbol following the comma symbol input from the encoder match in terms of symbol type, the loopback selector replaces the idle symbol following the comma symbol output from the earlier node device with a different type of symbol such that the running disparity remains as-is, and switches output so as to recover the normal mode from the loopback mode immediately after the matching idle symbols.

Accordingly, the running disparity and symbol lock are dependably maintained before and after the recovery of the normal mode, even when the running disparity of the comma symbols and idle symbols included in the idle frame is randomly switched.

Further still, in the above-described node device, at initialization time, the link controller sets a power saving control of the PHY as active or inactive, and during a packet gap following the postgap, when the power saving control is active, the symbol generator makes a transmission disable instruction for placing the later serial link in an electrical idle state, and when the power saving control is inactive, the symbol generator makes another transmission instruction maintaining symbol lock.

Accordingly, during the packet gap preceding the pregap, the device may select to reduce electrical power consumption by placing the serial link in an electrical idle state, or to reduce the latency of packet transmission and reception by continuing to transmit other idle symbols so as to maintain symbol lock.

In addition, the link controller continues to output the idle frame to the later serial link in accordance with the transmission instruction until detecting, in the PHY, (i) an electrical idle state in the earlier serial link, or (ii) another idle frame.

Accordingly, an idle frame period is guaranteed for the postgap, in order for the later node device to recover the normal mode.

Additionally, while looping back a data packet addressed to the other node device for output during the loopback mode, the link controller makes the recovery instruction upon detecting an end symbol of the data packet, and makes the recovery instruction upon detecting an electrical idle state of the earlier serial link or another idle frame symbol before detecting the end symbol.

Accordingly, recovery of the normal mode is possible despite the absence of an end symbol in the data packet, which serves as a trigger for the recovery instruction. This enables prevention of a lasting state in which packets cannot be received.

BRIEF DESCRIPTION OF DRAWINGS

FIG. 3A illustrates a sample packet format for a control command packet, FIG. 3B illustrates a sample packet format for a data command packet, FIG. 3C illustrates a sample packet format for a response packet, FIG. 3D illustrates a sample packet format for a data packet, and FIG. 3E illustrates a sample packet format for a message packet.

FIG. 4 lists examples of functions allocated to special 8b/10b symbols used by the node devices from FIG. 1.

FIG. 5 lists sample control symbol sets used by the node devices from FIG. 1.

FIG. 21 lists other sample control symbol sets used by the node devices from FIG. 1.

DESCRIPTION OF EMBODIMENTS

Embodiment

The following describes an Embodiment of the present invention, with reference to the accompanying drawings.

(Overall Configuration of Ring Transmission System)

Figure 1:
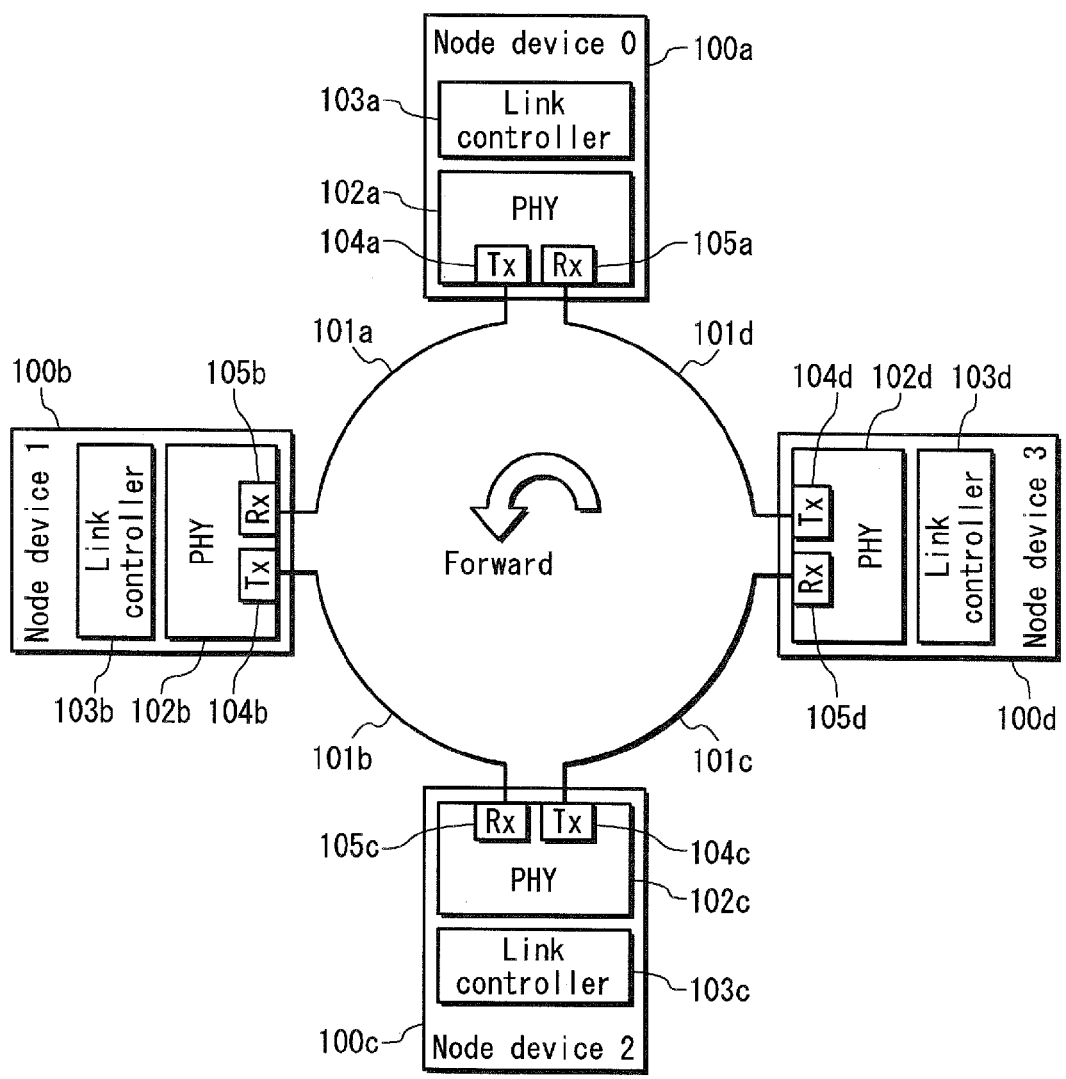
FIG. 1 illustrates the overall configuration of a ring transmission system pertaining to an Embodiment of the present invention.

FIG. 1 illustrates the overall configuration of a ring transmission system pertaining to the Embodiment of the present invention.

The ring transmission system of FIG. 1 includes four node devices 100a through 100d. The node devices 100a through 100d are connected in a ring via serial links 101a through 101d. Device IDs 0 through 3 assigned to the node devices 101a through 101d are indicated in FIG. 1 and so on.

Each node device 101a through 101d includes a PHY 102a through 102d and a link controller 103a through 103d. In the present Embodiment, node device 100a serves as a master node device (hereinafter, master device), while the other node devices 100b through 100d serve as slave node devices (hereinafter, slave devices).

The PHY 102a through 102d of each node device 100a through 100d performs interconversion between serial data input and output via the serial link 101a through 101d and parallel data handled by the link controllers 103a through 103d. Each PHY 102a through 102d is thus a processing block functioning at the physical layer. The link controller 103a through 103d of each node device 100a through 100d performs packet transmission and reception according to a predetermined protocol. Each link controller 103a through 103d is thus a processing block functioning at the logical layer.

The PHY 102a through 102d of each node device 100a through 100d includes a serial transmitter (Tx) 104a through 104d for the output of the serial data via the serial link 101a through 101d, and a serial receiver (Rx) 105a through 105d for the input of the serial data via the serial link 101d and 101a through 101c.

Here, serial transmitter 104a of node device 100a is connected via serial link 101a to serial receiver 105b of node device 100b, which is arranged one step later, in the ring. Similarly, serial transmitters 104b, 104c, and 104d of node devices 100b, 100c, and 100d are respectively connected via serial links 101b, 101c, and 101d to serial receivers 105c, 105d, and 105a of node devices 100c, 100d, and 100a, the latter devices each being arranged one step later than the former devices. As such, the node devices 101a through 101d are connected in a ring through the serial links 101a through 101d, thus forming a ring transmission system. The serial links 101a through 101d transmit the serial data in the forward direction indicated in FIG. 1.

In this example, the packets transmitted and received by the link controllers 103a through 103d include destination information. When the destination information of a received packet indicates the receiving device, the link controller 103a through 103d performs reception processing that interprets the received packet according to a predetermined protocol. On the other hand, when the destination information of a received packet indicates another device, the link controller 103a through 103d performs relay processing that hands the received packet to the next node device arranged later in the ring. As such, any node device arranged between the source node device and the destination node device serves as a repeater, thus enabling transmission and reception between the master device and any of the slave devices.

(Packet Format)

Figure 2:
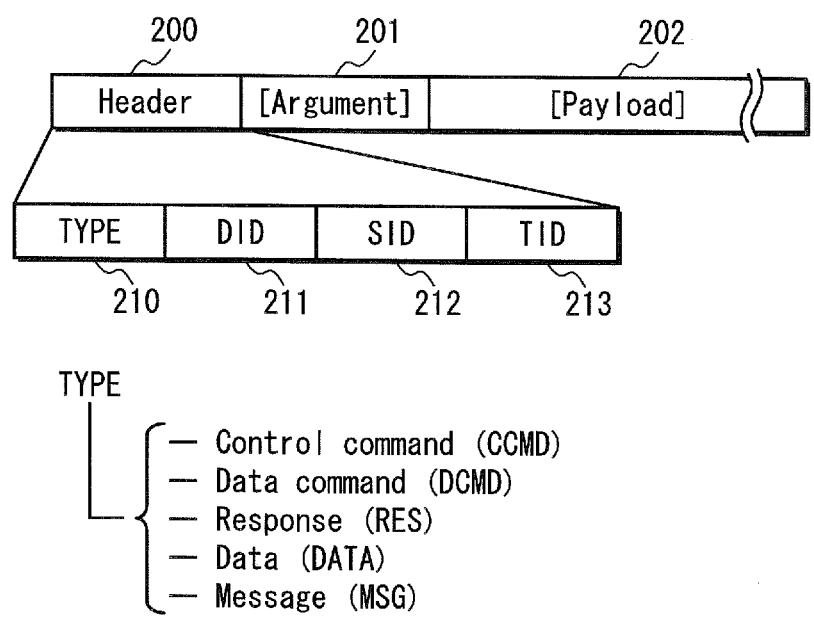
FIG. 2 illustrates the overall format of packets transmitted and received by node devices from FIG. 1, as well as the detailed configuration of a packet header.

The following describes the format of the packets transmitted and received by the node devices 100a through 100d from FIG. 1, with reference to FIG. 2 and to FIGS. 3A through 3E.

FIG. 2 illustrates the overall format of the packets transmitted and received by the node devices 100a through 100d from FIG. 1, as well as the detailed configuration of a packet header. As shown, the packet format includes a header 200, an argument 201, and a payload 202. The presence of the argument 201 and the payload 203 depends on the type of packet in question. The details thereof are described later. Given that the argument 201 and payload 202 may be absent, the positions thereof are marked with brackets in FIG. 2, as [Argument] and [Payload], respectively.

As shown in FIG. 2, the header 200 includes a packet type (TYPE) 210, a destination ID (DID) 211 serving as the aforementioned destination information, a source ID (SID) 212, and a transaction ID (TID) 213.

The packet type 210 indicates a specific type of packet. The following packet types are defined for the present Embodiment: control command packets (CCMD) issued by the master device in order to access, for instance, registers mapped to IO space; data command packets (DCMD) issued by the master device in order to access bulk data in memory space; response packets (RES) issued by a destination slave device in response to the above-described control command packets and data command packets; data packets (DATA) that contain the bulk data transferred between the master device and the slave devices by the data command packets; and message packets (MSG) notifying other devices of the device state via the serial link.

The destination ID 211 and the source ID 212 are designated using the device ID or similar allocated to each node device. The total number of node devices that may be connected in the ring is constrained by the field length of the destination ID 211 and source ID 212. Given that the field length is of four bits for the destination ID 211 and the source ID 212 in FIG. 2, the possible values for the device IDs are 0 through 15. Here, the device ID of the master device 100*a* is normally 0, while the device ID of each of the slave devices 100*b* through 100*d* is a unique value assigned upon initialization. In the example of FIG. 1, device IDs 1 through 3 are assigned to the slave devices 100*b* through 100*d*.

Further, transactions cannot be identified using the destination ID 211 and the source ID 212 when multiple data command packets are simultaneously between a given pair of the master device and a slave device and the data transfers (transactions) performed with such data command packets are executed by switching between time divisions. Thus, the transaction ID 213 is used to distinguish between transactions performed with multiple data command packets.

The following describes format details for each type of packet defined by the packet type 210, with reference to FIGS. 3A through 3E. Given that the header in each of FIGS. 3A through 3E is similar to the header 200 from FIG. 2, the detailed explanation thereof is omitted.

FIG. 3A illustrates a sample packet format for the control command packet.

The argument of the control command packet includes a R/W flag 300 indicating whether the data being transferred are to be read or written, a payload length (PLEN) 301 indicating the length of the IO data to be transferred by the control command, and an IO address 302 indicating an address in IO space to be accessed. When the R/W flag 300 is set to indicate writing, the payload of the control command packet includes IO write data 303 of the length designated by the payload length 301. When the R/W flag 300 is set to indicate reading, IO read data are included in the response packet corresponding to the control command packet. As such, the control command packet does not include the IO read data. Given that control command packets with no payload may exist, the position thereof is marked with brackets as [Payload] in FIG. 3A.

FIG. 3B illustrates a sample packet format for the data command packet.

The argument of the data command packet includes a R/W flag 310 indicating whether the data being transferred are to be read or written. A later-described extended argument includes a memory address 311, serving as the start address in memory space for the data transfer, and a transfer size 312, indicating the total size of the data transfer. Given that the length of the argument in each packet is fixed, an extended argument is defined for the memory address 311 and the transfer size 312, which do not fit into the argument proper. A common header is used by all packets, and the length of the argument is fixed for all packets. Accordingly, the link controllers 103*a* through 103*d* are easily able to interpret the received packets.

FIG. 3C illustrates a sample packet format for the response packet.

The argument of the response packet includes a NACK (Negative Acknowledgement) flag 320 indicating whether or not the node device (the communication party slave device) indicated by the destination ID 212 of the control command packet or data command packet has correctly received the packet in question. When the R/W flag 300 of the control command packet is set to indicate reading, the payload of the response packet includes IO read data 321 read out by the control command packet (of the length designated by the payload length 301 thereof). However, when the R/W flag 300 of the control command packet is set to indicate writing, the above-described IO write data are included in the control command packet itself. As such, the response packet does not include the IO write data. Given that response packets with no payload may exist, the position thereof is marked with brackets as [Payload] in FIG. 3C.

FIG. 3D illustrates a sample packet format for the data packet.

The data packet has no argument. The payload of the data packet includes the data accessed by the data command packet, fragmented into a predetermined block size as a data block 330. In the present Embodiment, the block size is of 512 bytes. Thus, the transfer size 312 of the data command packet designates a multiple of this 512-byte block size. In such circumstances, the data at the total size designated by the transfer size 312 are fragmented into 512-byte blocks, which are then transferred as data packets once a header has been affixed thereto. The block size may be other than 512-bytes, and may also be of variable size.

FIG. 3E illustrates a sample packet format for the message packet.

The argument of the message packet includes a message index 340 indicating the type of message and a message code 341 indicating attached information that varies according to the message type.

The message index 340 designates a message type such as flow control request (FCREQ), flow control ready (FCRDY), and status (STAT).

Flow control request and flow control ready messages are flow control information exchanged between the source node device and the destination node device before data transfer begins. Status messages are used by the destination node device to notify the source node device of any data reception errors after data transfer is complete. When the message index 340 indicates a status message, the message code 341 indicates the presence of any data reception errors.

The above-described packet format may be configured differently depending on the protocol in use. Allowable differences include field deletion or addition, and other need-based modifications.

(8b/10b Control Symbols)

The following describes, with reference to FIG. 4, special 8b/10b symbols used by the node devices 100*a* through 100*d* from FIG. 1. FIG. 4 lists examples of functions allocated to the special 8b/10b symbols used by the node devices 100*a* through 100*d* from FIG. 1.

The 8b/10b scheme involves imparting redundancy by converting 8-bit data to 10-bit data. This enables the use of twelve types of special K-symbols for control (control symbols), in addition to the D-symbol typically used to represent 8-bit (1-byte) data. FIG. 4 indicates the correspondence between each symbol name, mnemonic, function, source data (hexadecimal), and code symbol (binary). The source data (hexadecimal) column lists 8-bit data before encoding according to the 8b/10b scheme. The code symbol (binary) column lists 10-bit data after encoding according to the 8b/10b scheme.

Here, the 8b/10b scheme imparts redundancy by converting 8-bit data to 10-bit data. As such, two code symbols each having positive or negative polarity may be assigned to the source data. In 8b/10b encoding, the balance between the number of zeroes and ones in a code symbol, termed the running disparity (RD) is managed. The running disparity has two possible states: RD− and RD+. Generating a code symbol with a majority of zeroes causes a transition to RD−, generating a code symbol with a majority of ones causes a transition to RD+, and generating a code symbol with an equal number of zeroes and ones maintains the state reached by generating the previous code symbol. The code symbols generated depend on whether the running disparity is currently RD− or RD+. FIG. 4 lists the corresponding symbols in the Current RD− and Current RD+ columns.

For example, when the running disparity is RD−, a code symbol in the Current RD− column is selected. When the selected Current RD− code symbol has a majority of ones, the running disparity shifts from RD− to RD+, and when the selected Current RD− code symbol has an equal number of zeroes and ones, the running disparity is maintained as RD−.

Conversely, when the running disparity is RD+, a code symbol in the Current RD+ column is selected. When the selected Current RD+ code symbol has a majority of zeroes, the running disparity shifts from RD+ to RD−, and when the selected Current RD+ code symbol has an equal number of zeroes and ones, the running disparity is maintained as RD+.

The running disparity is also managed in 8b/10b decoding. Decoding a code symbol with a majority of zeroes causes a transition to RD−, decoding a code symbol with a majority of ones causes a transition to RD+, and decoding a code symbol with an equal number of zeroes and ones maintains the state reached by decoding the previous code symbol. Also, a running disparity error is detected when a code symbol that does not conform to the above-described encoding rules is received, such as a Current RD+ code symbol received despite the running disparity being RD−.

A subset of the 8b/10b control symbols assigned in FIG. 4 includes start of data burst (SDB) symbols, start of packet (SOP) symbols, logical idle (LIDL) symbols, comma (COM) symbols, data idle (DIDL) symbols, end of data burst (EDB) symbols, and end of packet (EOP) symbols.

COM symbols (K28.5) serve as delimiting characters in serial data, which is made up of a sequence of 8b/10b code symbols, used to achieve symbol lock such that two code symbols form a unique signal pattern that cannot be generated by any other combination of two code symbols. Here, 8b/10b symbol lock refers to a state in which delimiting positions (leading bits) of the code symbols are correctly recognized in the serial data such that conversion to parallel data is made possible.

A SOP symbol (K28.1) and an EDP symbol (K29.7) are respectively added to the head and tail of a packet and serve to identify the delimiting positions of the packet.

A SDB symbol (K28.0) and an EDB symbol (K27.7) are respectively added to the head and tail of a data burst, in which data packets equivalent to the window size specified in flow control are bundled, so as to identify the delimiting positions of the data burst serving as the unit of data transfer.

LIDL symbols (K28.3) and DIDL symbols (K28.6) are idle symbols used to maintain symbol lock by filling gaps between transmitted packets. The usage distinction between LIDL symbols and DIDL symbols is explained later.

In the sample given by FIG. 4, COM symbols (K28.5), LIDL symbols (K28.3), and DIDL symbols (K28.6) are unbalanced symbols, each having an unequal number of zeroes and ones.

When symbols become unlocked due to an unexpected transmission error, a COM symbol must be detected in order to re-establish symbol lock. Therefore, COM symbols are preferably transferred periodically. In the present Embodiment, COM symbols are typically paired with a control symbol that is not a COM symbol for use as a control symbol set. FIG. 5 lists examples of control symbol sets used in the present Embodiment. The control symbol sets listed in FIG. 5 each begin with a first symbol that is followed by a second symbol. The first symbol is a COM symbol (K28.5) used for lock. Here, SYN is a control symbol set made up of a COM symbol (K28.5) and a specific D symbol (D31.5). SYN is transmitted to establish symbol lock at initialization and before packet transmission. The control symbol sets defined in FIG. 5 are hereinafter represented by the names SDB, SOP, EDP, EDB, LIDL, and DIDL.

(Packet Framing)

Among the above-described control symbol sets, SDB, SOP, EOP, and EDB are framing symbol sets added to the head and tail of each type of packet listed in FIGS. 2 and 3A through 3E to be used as packet framing for identification.

Figure 6A:
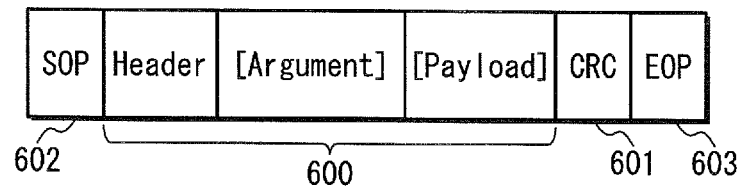
FIG. 6A illustrates a sample packet framing rule used by the node devices from FIG. 1.

FIG. 6A illustrates an example of packet framing rules used by the node devices 100a through 100d from FIG. 1.

A packet 600 as described in FIGS. 2 and 3A through 3E has a cyclic redundancy check (CRC) 601 appended thereto, calculated in order to confirm data integrity. Further, an SOP control symbol set 602 and an EOP control symbol set 603 are respectively added to the head and tail of the packet 600 having the CRC 601 appended thereto, thus forming a framed packet.

Figure 6B:
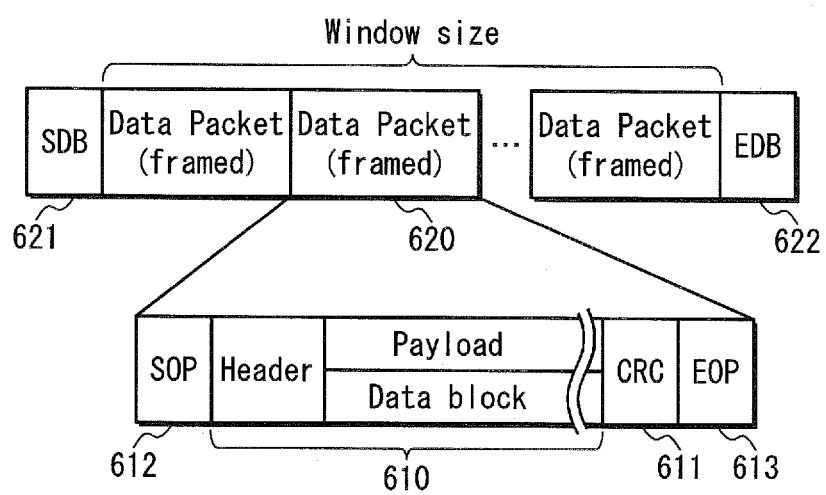
FIG. 6B illustrates a sample data burst framing rule used by the node devices from FIG. 1 for bundling data packets of a given window size.

FIG. 6B illustrates an example of data burst framing rules, data bursts being bundles of data packets equivalent to the window size used by the node devices 100a through 100d from FIG. 1. Each data packet 610 within a data burst is formatted as shown in FIG. 3D and framed according to the framing rule described using FIG. 6A. Once the framed data packets 620 (labeled DATA Packet (framed)) (each made up of a data packet 610 with a CRC 611 appended thereto, and further having an SOP control symbol set 612 and an EOP control symbol set 613 respectively added to the head and tail) have been bundled into the window size, an SDB control symbol set 621 and an EDB control symbol set 622 are respectively added to the head and tail thereof, thus forming a framed data burst.

(Node Device Configuration)

Figure 7:
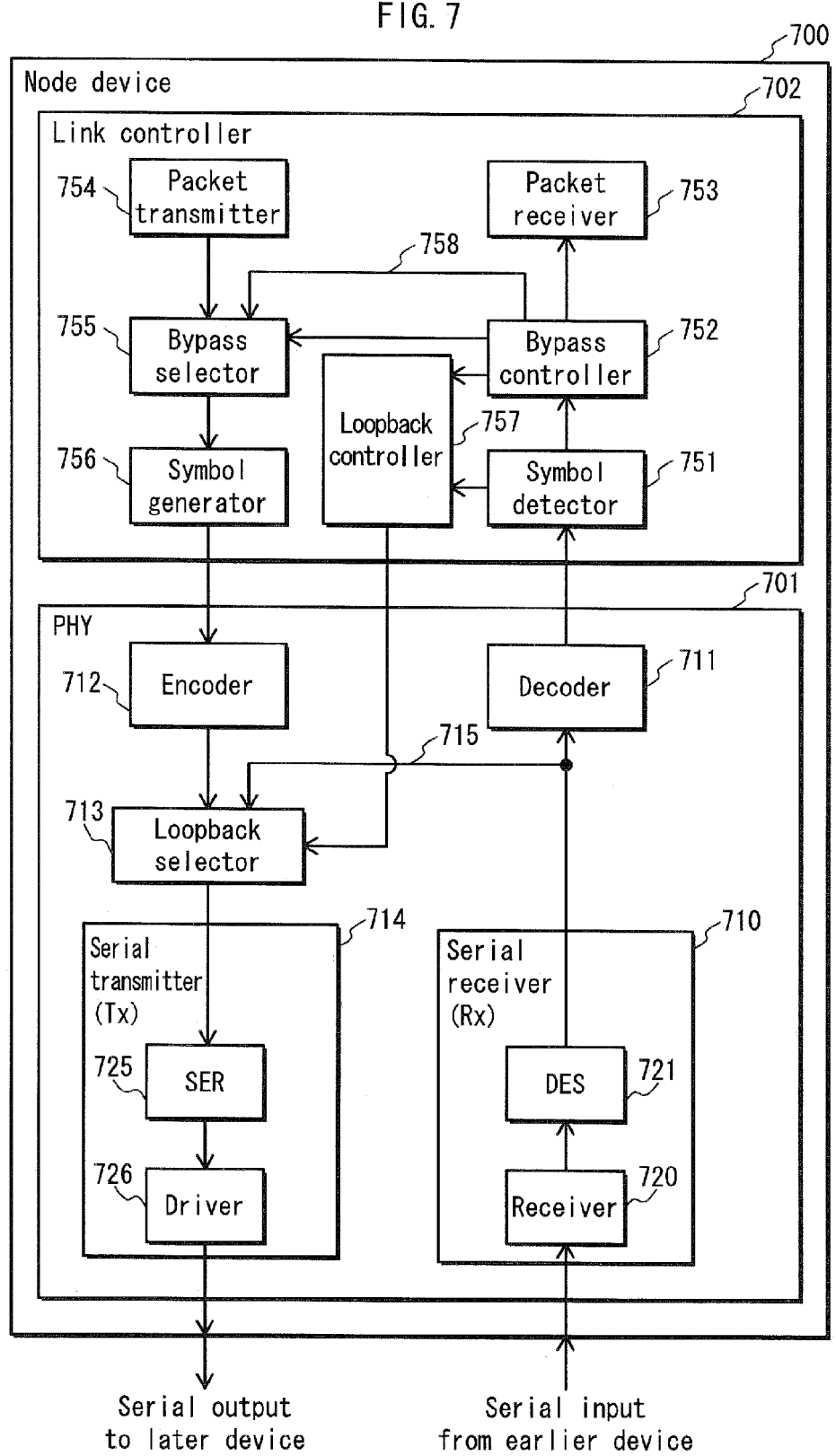
FIG. 7 is a configuration diagram of one of the node devices from FIG. 1.

The following describes the configuration of the node devices 100a through 100d from FIG. 1, with reference to FIG. 7. FIG. 7 is a configuration diagram of the node devices 100a through 100d (node device 700) from FIG. 1.

The node device 700 includes a PHY 701 and a link controller 702. The PHY 701 corresponds to the PHY 102a through 102d from FIG. 1, while the link controller 702 corresponds to the link controller 103a through 103d from FIG. 1.

PHY

The PHY 701 includes a serial receiver (Rx) 710, a decoder 711, an encoder 712, a loopback selector 713, and a serial transmitter (Tx) 714. The serial receiver 710 corresponds to the serial receiver 105a through 105d from FIG. 1, while the serial transmitter 714 corresponds to the serial transmitter 104a through 104d from FIG. 1.

The serial receiver 710 includes a receiver 720 and a deserializer (DES) 721. The receiver 720 generates serial receive data from the serial data input from the serial link (serial links 101a through 101d). The deserializer 721 detects the leading bit position of a symbol by detecting a delimiting character, such as the above-described COM symbol, in the serial receive data bit sequence from the receiver for conversion into parallel receive data of 8b/10b symbol length (10-bit width). The parallel receive data output from the deserializer 721 are input to the decoder 711, and branched off by a loopback path 715 for input to the loopback selector 713. The parallel receive data branched off by the loopback path 715 and input to the loopback selector 713 are hereinafter referred to as parallel loopback data.

The decoder 711 decodes each 10-bit symbol of data making up the parallel receive data into 8-bit (1-byte) width 8b/10b raw data. The decoder 711 then outputs the raw data obtained by decoding (hereinafter, raw receive data) to the link controller 702. The decoder 711 also performs running disparity management, such as by detecting a running disparity error when the running disparity of the received 10-bit symbol data does not match the running disparity as managed.

The encoder 712 encodes the raw data input from the link controller 702 (hereinafter, raw transmit data) in 8-bit (1-byte) units into 10-bit width symbol data according to the 8b/10b scheme. The encoder 712 then outputs parallel transmit data made up of the 10-bit width symbol data to the loopback selector 713. The encoder 712 performs running disparity management, and encodes in accordance with the 8b/10b scheme.

The loopback selector 713 receives instructions from a later-described loopback controller 757 in the link controller 702, switches between output selections with predetermined timing, and outputs either the parallel transmit data or the parallel loopback data to the serial transmitter 714. The details of output switching by the loopback selector 713 are described in detail, later.

The node device 700 is said to be in normal mode while in a state where the parallel transmit data are selected as the output of the loopback selector 713 for the link controller 702. Similarly, the node device 700 is said to be in loopback mode while in a state where the parallel loopback data branched off by the loopback path 715 are so selected.

The serial transmitter 714 includes a serializer (SER) 725 and a driver 726. The serializer 725 converts parallel transmit data or parallel loopback data of 8b/10b symbol length (10-bit width) into serial transmit data or serial loopback data. The driver 726 generates serial data from the serial transmit data or serial loopback data from the serializer 725 for output to the serial link (serial links 101a through 101d).

In order to reduce electric power consumption, the link controller 702 is able cause an electrical idle (high impedance) state that cannot occur during operations by stopping the operations of the serial transmitter 714. Given that the serial links 101a through 101d continue to be pulled-up and pulled-down during the electrical idle state, the serial receiver 710 detects such pull-up or pull-down operations occurring and automatically stops these operations.

Link Controller

The link controller 702 includes a symbol detector 751, a bypass controller 752, a packet receiver 753, a packet transmitter 754, a bypass selector 755, a symbol generator 756, and a loopback controller 757.

The symbol detector 751 detects the head and tail of each packet and data burst in the raw receive data input from the PHY 701 according to the framing rules illustrated by FIGS. 6A and 6B, and outputs only the packets 600 included in correctly received data to the bypass controller 752. At this time, upon detecting an EDB symbol in the raw receive data, the symbol detector 751 notifies the loopback controller 757 of the EDB symbol detection. When the symbol detector 751 confirms a violation of the framing rules illustrated by FIGS. 6A and 6B, a transmission error in the CRC check, or the like, the packet 600 cannot be correctly received. Any such packet 600 is therefore discarded. Also, given that control symbol sets such as the LIDL, DIDL, and SYN sets from FIG. 5 are not used for true data transmission, these symbol sets are removed by the symbol detector 751.

The bypass controller 752 makes a determination as to whether the received packet input from the symbol detector 751 is to be acknowledged by the node device 700, or relayed via a bypass path 758 to a node device arranged later in the ring. The determination is made in accordance with the destination ID 211 included in the header 200 of the received packet. When the received packet is addressed to the receiving device, the bypass controller 752 determines that the received packet is to be acknowledged and therefore outputs the received packet to the packet receiver 753. When the received packet is addressed to another device, the bypass controller 752 determines that the received packet is to be relayed and therefore outputs the received packet to the bypass selector 755 via the bypass path 758.

Upon determining that the received packet is addressed to another device, the bypass controller 752 makes a further determination as to whether or not the received packet is a flow control request message packet indicating a transmission request (corresponding to a transmission request packet in the present Embodiment), and notifies the loopback controller 757 of the result.

When the bypass controller 752 has determined that the received packet is to be acknowledged, the packet receiver 753 performs reception processing on the received packet in accordance with a predetermined protocol.

The packet transmitter 754 performs transmission processing, such as issuing command packets (control command packets or data command packets) for beginning data transfer, issuing response packets whenever command packets are received by the packet receiver 753, issuing data packets, issuing message packets, and so on.

The bypass selector 755 selects, according to the results determined by the bypass controller 752, one of the received packet relayed via the bypass path 758 and a transmission packet generated by the packet transmitter 754 for output to the symbol generator 756. When the bypass controller 752 has determined that the received packet is to be relayed, the bypass selector 755 selects the received packet input via the bypass path 758 for output.

The symbol generator 756 frames the packet input from the bypass selector 755 (the transmission packet issued by the packet transmitter 754 or the packet undergoing relay processing via the bypass path 758) in accordance with the framing rules indicated by FIGS. 6A and 6B, and then outputs the raw transmit data of the framed packet to the PHY 701. Also, when no packet is present, the symbol generator 756 has control over whether an idle frame transmission instruction is to be issued to the PHY 701, or whether the serial transmitter 714 operations are to be stopped by placing the serial link in an electrical idle state. Here, the symbol generator 714 makes an idle frame transmission instruction to the PHY 701 by, for example, outputting a control symbol set such as LIDL or DIDL as raw transmit data to the PHY 701.

The loopback controller 757 instructs the loopback selector 713 to switch between output selections according to the results determined by the bypass controller 752 and detected by the symbol detector 751. In the present Embodiment, the loopback controller 757 receives the determination made by the bypass controller 752 as to whether the received packet is addressed to another device or is a flow control request message packet indicating a transmission request. The loopback controller 757 then instructs the loopback selector 713 to switch output from the parallel transmit data to the parallel loopback data. The loopback controller 757 also receives notice of any EDB symbols detected by the symbol detector 756, and then instructs the loopback selector 713 to switch output from the parallel loopback data to the parallel transmit data.

Although the node device 700 must be in normal mode immediately after initialization when normal data transfer is to occur, the node device 700 must instead be in loopback mode immediately after initialization when the BER (Bit Error Rate) is being measured using only the serial receiver 710 and the serial transmitter 714, in order to test the PHY 701.

(Node Device Operations)

Figure 8:
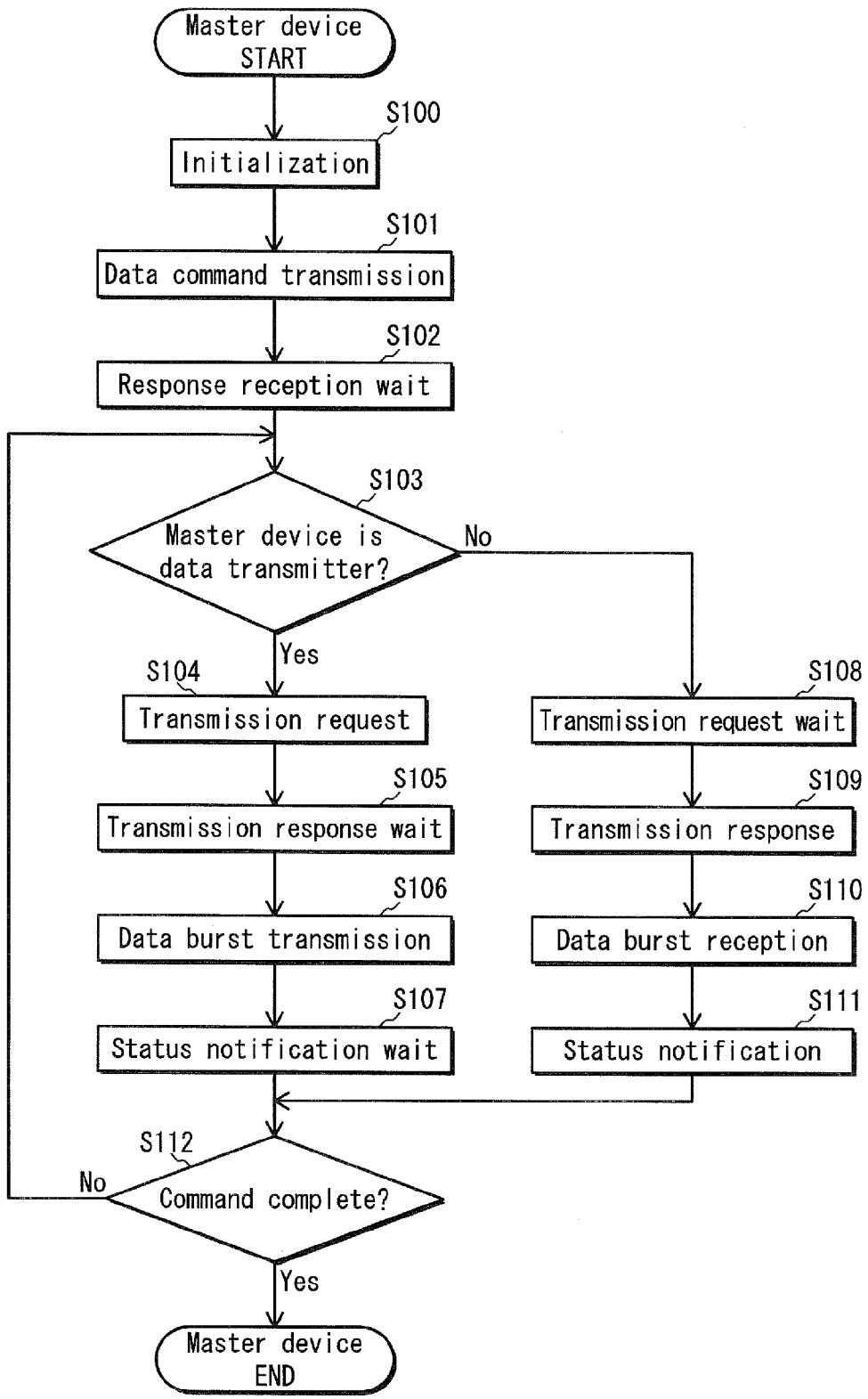
FIG. 8 is a flowchart describing the operations of a master node device (master device) from FIG. 1.
Figure 9:
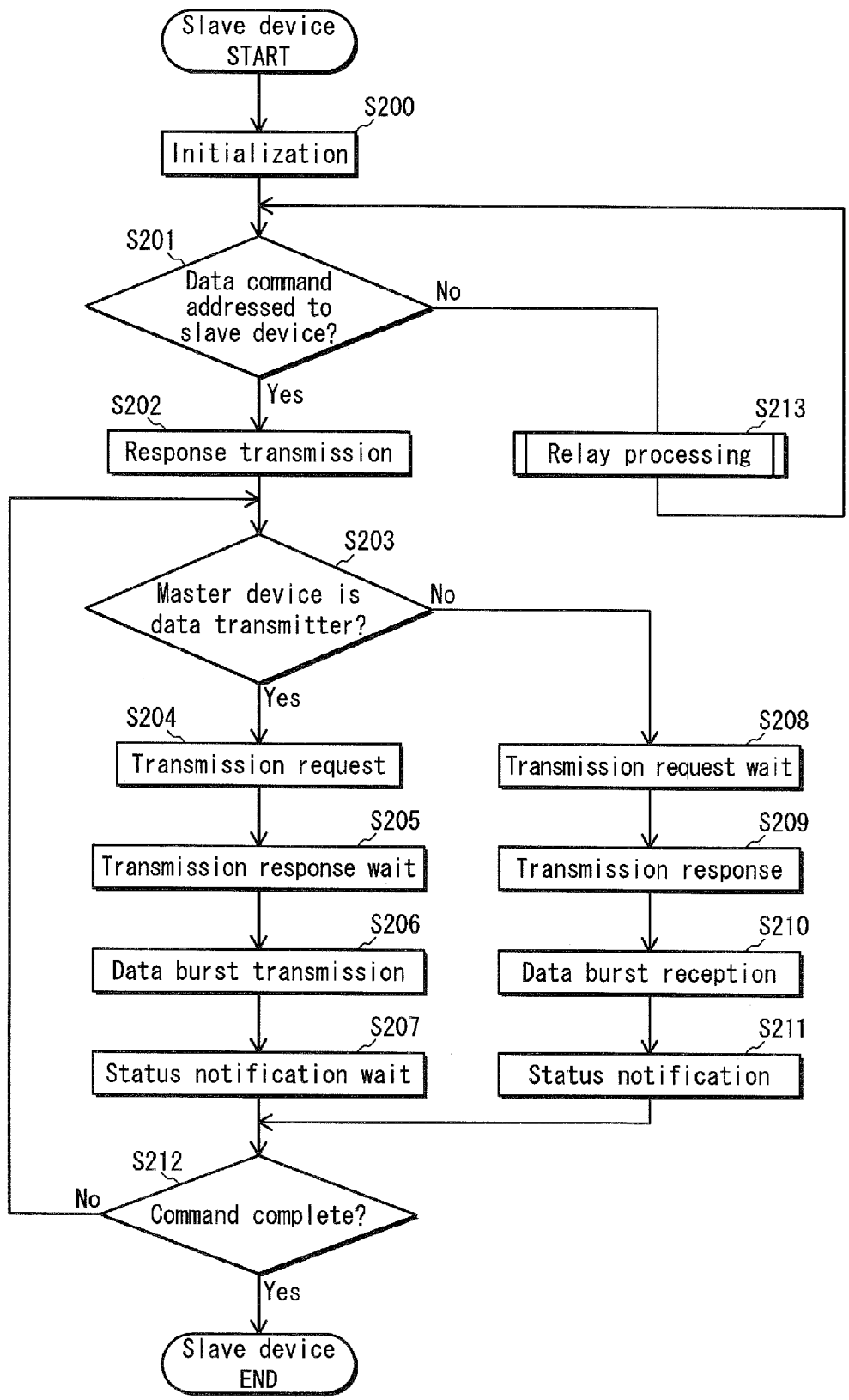
FIG. 9 is a flowchart describing the operations of a slave node device (slave device) from FIG. 1.
Figure 10:
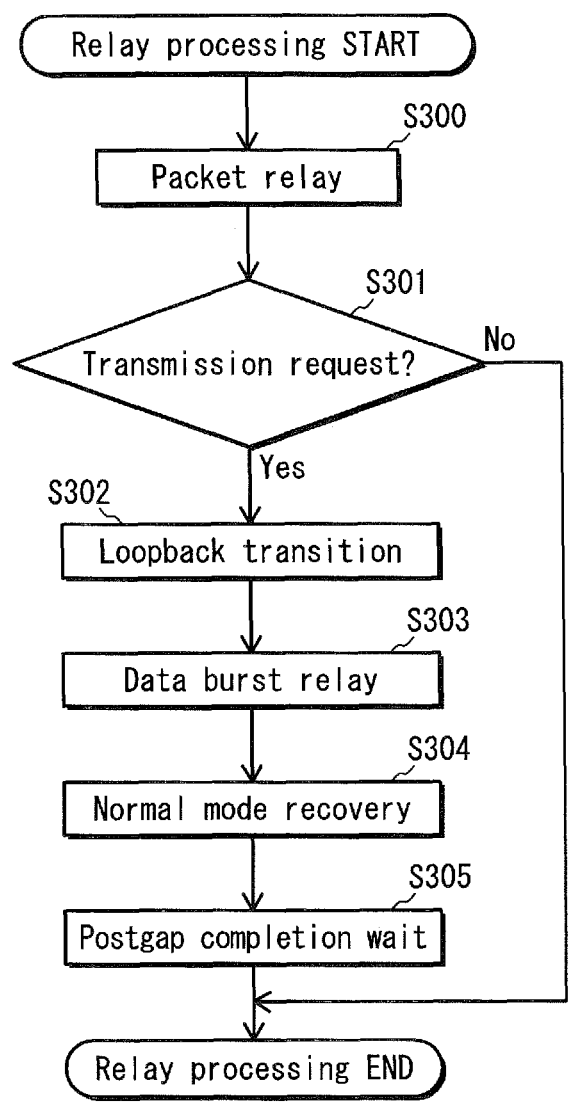
FIG. 10 is a flowchart describing the details of a relay processing step from FIG. 9.

The following describes the respective operations of the master node device (master device) 100a and of the slave node devices (slave devices) 100b through 100d in the ring transmission system from FIG. 1, with reference to FIGS. 8, 9, and 10. FIG. 8 is a flowchart describing the flow of operations of the master device 100a from FIG. 1, while FIGS. 9 and 10 are flowcharts describing the flow of operations of the slave devices 100b through 100d from FIG. 1. For convenience, the following explanations are given for FIGS. 8 and 9 in combination where appropriate.

An initialization step is performed by the master device 100a (step S100) and by the slave devices 100b through 100d (step S200). Initialization involves, for example, setting operational parameters regulating the operations of the node devices 100a through 100d, such as electrical control settings indicating whether or not the serial links 101a through 101d are in an electrical idle state for flow control cycles (i.e., for the transfer size of data bursts), setting packet gaps (described later with reference to FIGS. 11 and 12) and the like. Here, the master device 100a obtains the operational parameters of each slave device 100b through 100d through a read control command packet (CCMD) indicating the packet format given in FIGS. 2 and 3A, sets the appropriate operational parameter values, and sets the operational parameter values so set for each slave device 100b through 100d via a write control command packet (CCMD) indicating the packet format given in FIGS. 2 and 3A.

A data command transmission step is performed by master device 100a to begin data transfer. In this step, the master device 100a transmits a data command packet (DCMD) indicating the packet format given in FIGS. 2 and 3B to a communication party slave device (step S101). Meanwhile, the slave devices 100b through 100d are in a data command reception wait step. Once a packet is received, the bypass controller 752 determines whether or not the received packet is a data command packet (DATA) addressed to the receiving device according to the packet type 210 and the destination ID 211 in the received packet header (step 201).

Upon receiving a data command packet so addressed (Yes in step S201), the slave devices 100b through 100d perform a response transmission step of transmitting a response packet (RES) indicating the packet format given in FIGS. 2 and 3C to the master device 100a (step S202). The process then moves on to step S203. The master device 100a, having transmitted the data command packet in step S101, is in a response reception wait step until the reception of the response packet transmitted by the destination slave device (communication party slave device) of the transmitted data command packet (step S102). The process then moves on to step S103. Thus, the master device 100a and the destination slave device of the data command (communication party slave device) complete a command-response handshake. Subsequently, the master device 100a and the communication party slave device respectively perform data burst transmission and reception through a symmetric protocol described in steps S103 through S112 and in steps S203 through S212.

While in the data command reception wait step, the non-communication party slave devices receive packets addressed to another device. Upon receiving such a packet (No in step S201), the slave devices perform a relay processing step of performing relay processing and the like on the received packet (step S213). The process then returns to step S201. The details of the relay processing step that is step S213 are described later with reference to FIG. 10.

Once the command-response handshake between the master device 100a and the communication party slave device has been completed, the master device 100a performs a data transmitter determination step of determining whether or not the master device 100a is the data burst transmitter (step S103). This determination is made in accordance with the R/W flag 310 in the data command packet exchanged with the communication party slave device. During the data transmitter determination step, the communication party slave device also determines whether or not the slave device is the data burst transmitter (step S203). This determination is similarly made in accordance with the R/W flag 310 in the data command packet exchanged with the master device master device 100a. Here, when the R/W flag 310 has been set to write, the master device 100a determines itself as being the data burst transmitter, and the communication party slave device determines itself as not being the data burst transmitter (i.e., as being the data burst receiver). On the other hand, when the R/W flag 310 has been set to read, the master device 100a determines itself as not being the data burst transmitter (i.e., as being the data burst receiver) and that the communication party slave device determines itself as being the data burst transmitter.

Upon determining itself as being the data burst transmitter (Yes in step S103), the master device 100a performs data burst transmission in accordance with steps S104 through 107. In contrast, upon determining itself as being the data burst receiver (No in step S203), the communication party slave device performs data burst reception in accordance with steps S208 through S211. On the other hand, upon determining itself as being the data burst receiver (No in step S103), the master device 100a performs data burst reception in accordance with steps S108 through 111. In contrast, upon determining itself as being the data burst transmitter (Yes in step S203), the communication party slave device performs data burst transmission in accordance with steps S204 through S207. In the present Embodiment, flow control involves the use of a fixed window size, which is shared between the master device 100a and the slave devices 100b through 100d during the initialization steps (steps S100 and S200). However, other approaches are also possible.

The following describes the processing performed when the master device 100a is the data burst transmitter and the communication party slave device is the data burst receiver.

The master device 100a performs a transmission request step that involves preparing to transmit data equivalent to the window size. Once this data transmission preparation is complete, the master device 100a transmits a flow control request (FCREQ) message packet indicating the packet format from FIGS. 2 and 3E to the communication party slave device (step S104). The communication party slave device enters a transmission request wait step of preparing to receive data equivalent to the window size and receives the flow control request message packet indicating the flow control transmission request transmitted by the master device 100a (step S208).

Upon receiving the flow control request message packet and once the data reception preparation is complete, the communication party slave device performs a transmission response step of transmitting a flow control ready (FCRDY) message packet indicating the packet format from FIGS. 2 and 3E to the master device 100a as a flow control transmission response (step S209). During a transmission response wait step, the master device 100a receives the flow control ready message packet indicating the flow control transmission response transmitted by the communication party slave device (step S105).

Upon receiving the flow control ready message packet, the master device 100a performs a data burst transmission step of transmitting a data burst (step S106). Then, during a data burst reception step, the communication party slave device receives the data burst transmitted by the master device 100a and verifies whether the framing rules given in FIG. 6B have been violated (i.e. checks for framing errors) or whether any errors have occurred in the CRC 611 of each data packet 620 (i.e. checks for CRC errors) (step S210). During a status notification step, the communication party slave device transmits a status (STAT) message packet indicating the packet format from FIGS. 2 and 3E and including notification regarding such errors to the master device 100a (step S211). During a status notification wait step, the master device 100a receives the status message packet transmitted by the communication party slave device (step S107).

During a command completion determination step, the master device 100a determines whether a data transfer equivalent to the data size designated in the transfer size 312 of the data command packet is complete (step S112). As long as the data transfer equivalent to the data size designated in the transfer size 312 of the data command packet is not complete (No in step S112), the master device 100a repeats steps S103, S104 through S107, and S112. Once the data transfer equivalent to the data size designated in the transfer size 312 of the data command packet is complete (Yes in step S112), the master device 100a ends the data burst transfer processing pertaining to the data command packet transmitted in step S101.

During the command completion determination step, the communication party slave device determines whether the data transfer equivalent to the data size designated in the transfer size 312 of the data command packet is complete (step S112). As long as the data transfer equivalent to the data size designated in the transfer size 312 of the data command packet is not complete (No in step S212), the communication party slave device repeats steps S203, S208 through S211, and S212. Once the data transfer equivalent to the data size designated in the transfer size 312 of the data command packet is complete (Yes in step S212), the communication party slave device ends the data burst transfer processing pertaining to the data command packet received in step S201.

The following describes the processing performed when the master device 100a is the data burst receiver and the communication party slave device is the data burst transmitter.

The communication party slave device performs a transmission request step that involves preparing to transmit data equivalent to the window size. Once the data transmission preparation is complete, the communication party slave device transmits a flow control request (FCREQ) message packet indicating the packet format from FIGS. 2 and 3E to the master device 100a (step S204). The master device 100a enters a transmission request wait step of preparing to receive data equivalent to the window size. The master device 100a then receives the flow control request message packet indicating the flow control transmission request transmitted by the communication party slave device (step S108).

Upon receiving the flow control request message packet and once the data reception preparation is complete, the master device 100a performs a transmission response step of transmitting a flow control ready (FCRDY) message packet indicating the packet format from FIGS. 2 and 3E to the communication party slave device as a flow control transmission response (step S109). During a transmission response wait step, the communication party slave device receives the flow control ready message packet indicating the flow control transmission response transmitted by the master device 100a (step S205).

Upon receiving the flow control ready message packet, the communication party slave device performs a data burst transmission step of transmitting a data burst (step S206). Then, during a data burst reception step, the master device 100a receives the data burst transmitted by the communication party slave device and verifies whether the framing rules given in FIG. 6B have been violated (i.e. checks for framing errors) or whether any errors have occurred in the CRC 611 of each data packet 620 (i.e. checks for CRC errors) (step S110). During a status notification step, the master device 100a transmits a status (STAT) message packet indicating the packet format from FIGS. 2 and 3E that includes notification regarding such errors to the communication party slave device (step S111). During a status notification wait step, the communication party slave device receives the status message packet transmitted by the master device 100a (step S207).

During the command completion determination step, the communication party slave device determines whether the data transfer equivalent to the data size designated in the transfer size 312 of the data command packet is complete (step S212). As long as the data transfer equivalent to the data size designated in the transfer size 312 of the data command packet is not complete (No in step S212), the communication party slave device repeats steps S203, S204 through S207, and S212. Once the data transfer equivalent to the data size designated in the transfer size 312 of the data command packet is complete (Yes in step S212), the communication party slave device ends the data burst transfer processing pertaining to the data command packet received in step S201.

During a command completion determination step, the master device 100a determines whether a data transfer equivalent to the data size designated in the transfer size 312 of the data command packet is complete (S112). As long as the data transfer equivalent to the data size designated in the transfer size 312 of the data command packet is not complete (No in step S112), the master device 100a repeats steps S103, S108 through S111, and S112. Once the data transfer equivalent to the data size designated in the transfer size 312 of the data command packet is complete (Yes in step S112), the master device 100a ends the data burst transfer processing pertaining to the data command packet transmitted in step S101.

Figure 11:
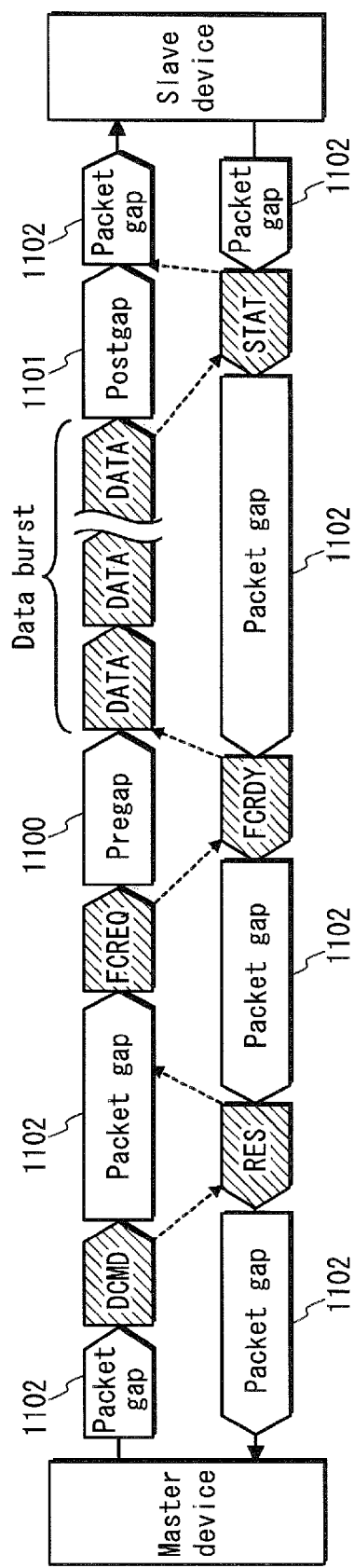
FIG. 11 illustrates a sample write data command processing sequence occurring between the master node device (master device) and a communication party node device (slave device) from FIG. 1.
Figure 12:
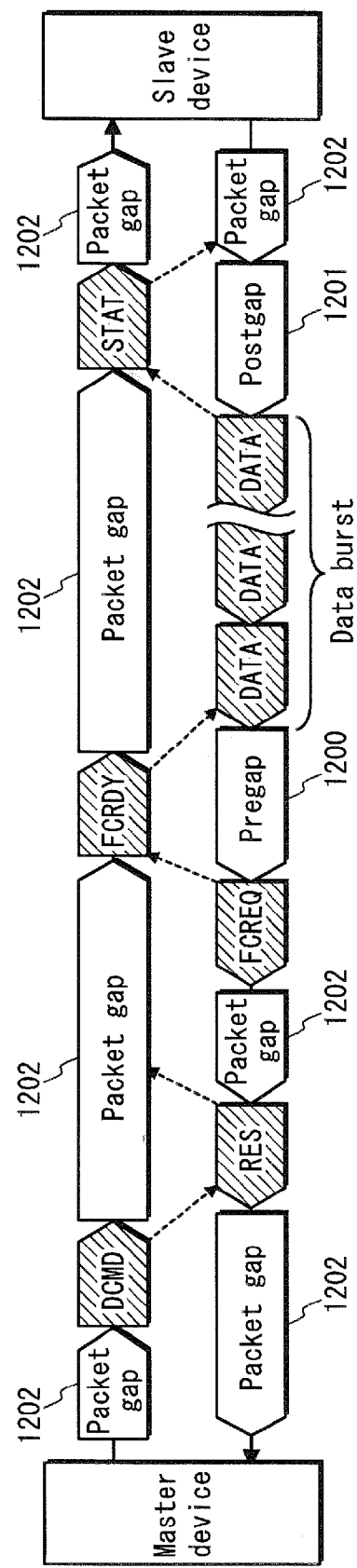
FIG. 12 illustrates a sample read data command processing sequence occurring between the master node device (master device) and a communication party node device (slave device) from FIG. 1.

The following describes the read and write data command processing sequence occurring between the master device 100a and the communication party slave device, with reference to FIGS. 11 and 12. FIG. 11 illustrates the write data command processing sequence occurring between the master device 100a and the communication party slave device from FIG. 1. FIG. 12 illustrates the read data command processing sequence occurring between the master device 100a and the communication party slave device from FIG. 1.

Regardless of read and write distinctions, a pregap 1100 or 1200 occurs from the end of flow control request (FCREQ) message packet transmission until the start of data burst transmission, followed by a postgap 1101 or 1201 from the end of data burst transmission until the end of status (STAT) message packet reception. Also, a packet gap 1102 or 1202 occurs between all other types of transmission packet.

The symbol generator 756 of the link controller 702 sends transmission instructions to the PHY 701, as described below, when no transmission packets are present, such as during the pregap 1100 or 1200, the postgap 1101 or 1201, and the packet gap 1102 or 1202.

The symbol generator 756 repeatedly makes a DIDL control symbol set as shown in FIG. 5 (beginning with a COM symbol for symbol lock and including a DIDL symbol as the idle symbol) transmission instruction serving as a first idle frame to the PHY 701 during the pregap 1100 or 1200 and the postgap 1101 or 1201. For example, the symbol generator 756 performs the transmission instruction by handing over, to the PHY 701, a control symbol set that begins with a COM symbol (source data) for symbol lock and includes a DIDL symbol (source data), which is an idle symbol.

On the other hand, during the packet gap 1102 or 1202 and in accordance with power saving settings set at initialization (S100 or S200), the symbol generator 756 repeatedly makes a transmission instruction of a second idle frame to the PHY 701, or makes a transmission disable instruction to the PHY 701 in order to stop the operations of the serial transmitter 714. When the power saving settings are inactive, the symbol generator 756 repeatedly makes a transmission instruction of a LIDL control symbol set as given in FIG. 5 (beginning with a COM symbol for symbol lock and including a DIDL symbol as the idle symbol) serving as the second idle frame to the PHY 701. For example, the symbol generator 756 performs the transmission instruction by handing over, to the PHY 701, a control symbol set that begins with a COM symbol (source data) for symbol lock and includes a LIDL symbol (source data), which is an idle symbol. Conversely, when the power saving settings are active, the symbol generator 756 makes the transmission disable instruction to the PHY 701 in order to stop the operations of the serial transmitter 714. The serial link thus enters the electrical idle state. In such circumstances, before making any further packet transmissions during the packet gap 1102 or 1202, a SYN control symbol set as given in FIG. 5 must be repeatedly transmitted at a predetermined interval in order to recover the symbol lock lost due to the electrical idle state.

The above describes packet transmission and reception between the master device 100*a* and the communication party slave device. However, the packets must reach the destination node device by having a slave device other than the communication party perform relay processing thereon. The following describes the operations of a slave device that is not the communication party, with reference to FIG. 10.

As described above, when one of the slave devices 100*b* through 100*d* receives a packet addressed to another device during the data command reception wait step from FIG. 9 (No in step S201), a relay processing step is performed corresponding to step S213, shown in detail in FIG. 10.

FIG. 10 is a flowchart describing the details of the relay processing step S213 from FIG. 9.

During the relay step, the bypass selector 755 of the link controller 702 of a slave device (non-communication party communication device) having received a packet addressed to another device selects and outputs the received packet input via the bypass path 758 according to the results determined by the bypass controller 752, thereby relaying the received packet (step S300).

During a packet type determination step, the bypass controller 752 of the non-communication party communication device determines whether the received packet having undergone relay processing is a flow control request message packet indicating a transmission request according to the packet type 210 of the packet header (step S301). When the received packet having undergone relay processing is a flow control request message packet indicating a transmission request (Yes in S301), the non-communication party communication device advances to step 302 of processing. Conversely, the relay processing ends and the process returns to step S201 of FIG. 9 for any packet that is not a flow control request packet (No in step S301).

The flow control request message packet is relay using the bypass path 758 and is followed by a pregap 1100 as indicated in FIG. 11 or by a pregap 1200 as indicated in FIG. 12. Therefore, during a loopback transition step, the non-communication party slave device begins and repeatedly transmits a DIDL control symbol set serving as the first idle frame by having the symbol generator 756 make a DIDL control symbol set transmission instruction to the PHY 701. Then, the loopback controller 757 of the non-communication party slave device instructs the loopback selector 713 to make a transition from normal mode to loopback mode. The loopback selector 713 thus switches output from parallel transmit data to parallel loopback data (step S302).

Figure 13:
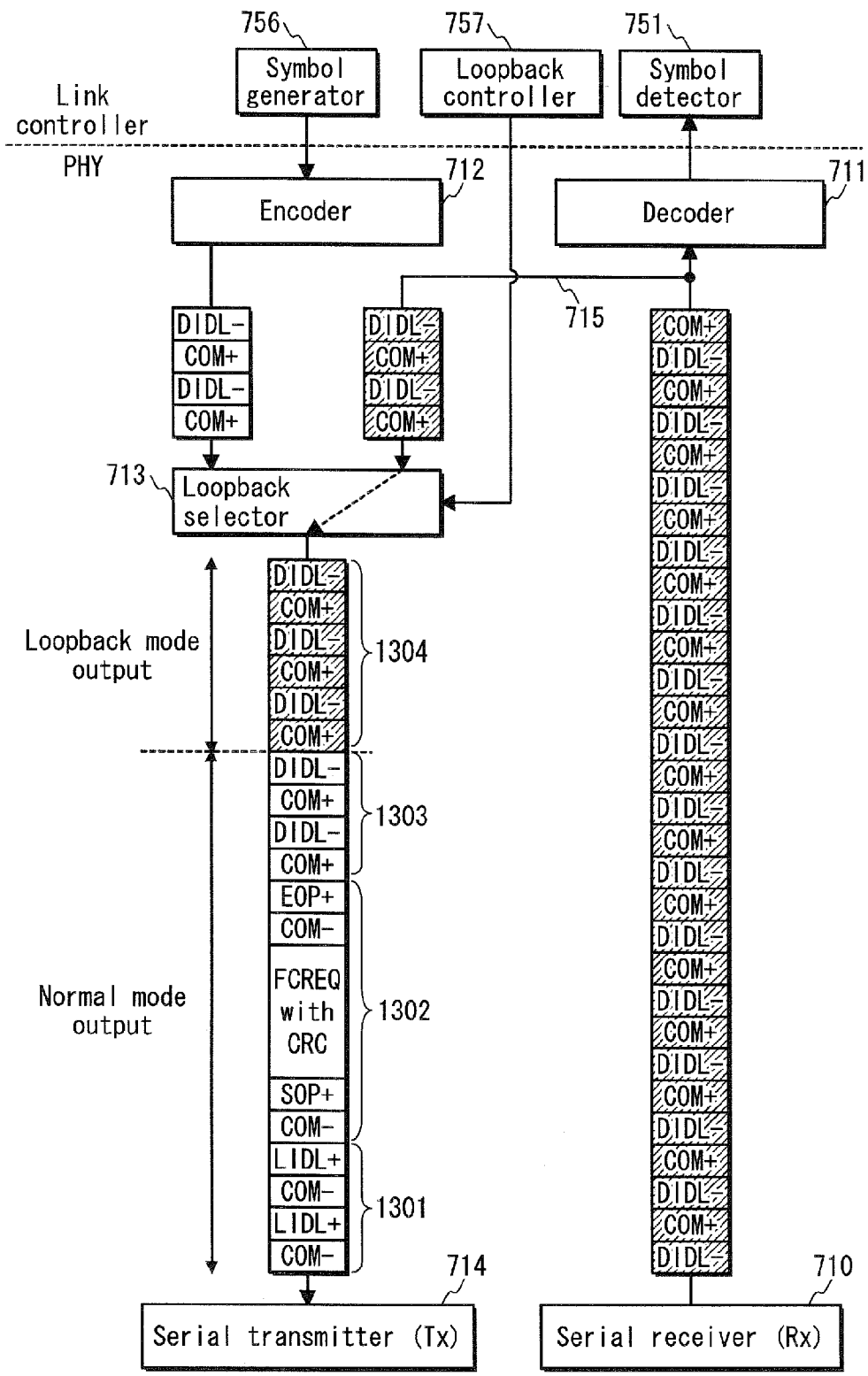
FIG. 13 illustrates the timing of output switching occurring before and after loopback mode transition by a loopback selector from FIG. 7.

The following describes the details of timing the output switch of the loopback selector 713 before and after the loopback mode transition. FIG. 13 illustrates the timing of output switching occurring before and after the loopback mode transition of the loopback selector 713 from FIG. 7.

During the packet gap lasting until the completion of flow control request message packet relay processing, the output of the loopback selector 713 is a second idle frame, such as a LIDL control symbol set 1301 (the output of the encoder 712). Then, during the pregap occurring after the relay of the flow control request message packet 1302, a DIDL control symbol set 1303, which is the first idle frame (the output of the encoder 712), is output by the loopback selector 713.

Upon receiving a transition instruction from the loopback controller 757 to switch from normal mode to loopback mode after the relay of the flow control request message packet, the loopback selector 713 makes the transition to loopback mode by switching the output from parallel transmit data to parallel loopback data, and then begins to output a DIDL control symbol set 1304 replicated via the loopback path 715. When the position of the COM symbol is offset by one symbol between the parallel transmit data and the parallel loopback data, the loopback selector 713 may internally delay the parallel loopback data by one symbol before output.

As shown in FIG. 4, the LIDL and DIDL symbols of the present Embodiment are, much like the COM symbols, unbalanced symbols each having an unequal number of zeroes and ones. Therefore, when control symbol sets as shown in FIG. 5 are consecutively transmitted as idle frames, the running disparity inverted by the COM symbol is reverted by the consecutive LIDL or DIDL symbols. As a result, the running disparity is normally maintained over the course of the idle frames. Once the running disparity of the idle frames transmitted in the packet gap following initialization is harmonized as one of RD– or RD+, the running disparity of subsequent idle frames changes depending on the packet transmitted. However, the running disparity of idle frames in the transmission channel of a single packet is uniform. Consequently, the running disparity of idle frames transmitted and received by a non-communication party slave device relaying data command (DCMD) packets, response (RES) packets, and the like between the master device 100*a* and the communication party slave device remains uniform. Accordingly, the running disparity and symbol lock are maintained before and after the loopback selector 713 switches output by arranging the COM symbol positions.

The LIDL control symbol sets and the DIDL control symbol sets are not limited to the definitions of FIG. 5 but may also select a balanced symbol having an equal number of zeroes and ones as the second symbol, or may randomly switch between unbalanced and balanced symbols. In such circumstances, electro-magnetic interference (EMI) noise caused by the cyclical signal pattern is reduced by the random switching in the running disparity of the COM symbols in consecutive LIDL control symbol sets and in consecutive DIDL symbol control symbol sets.

Figure 14:
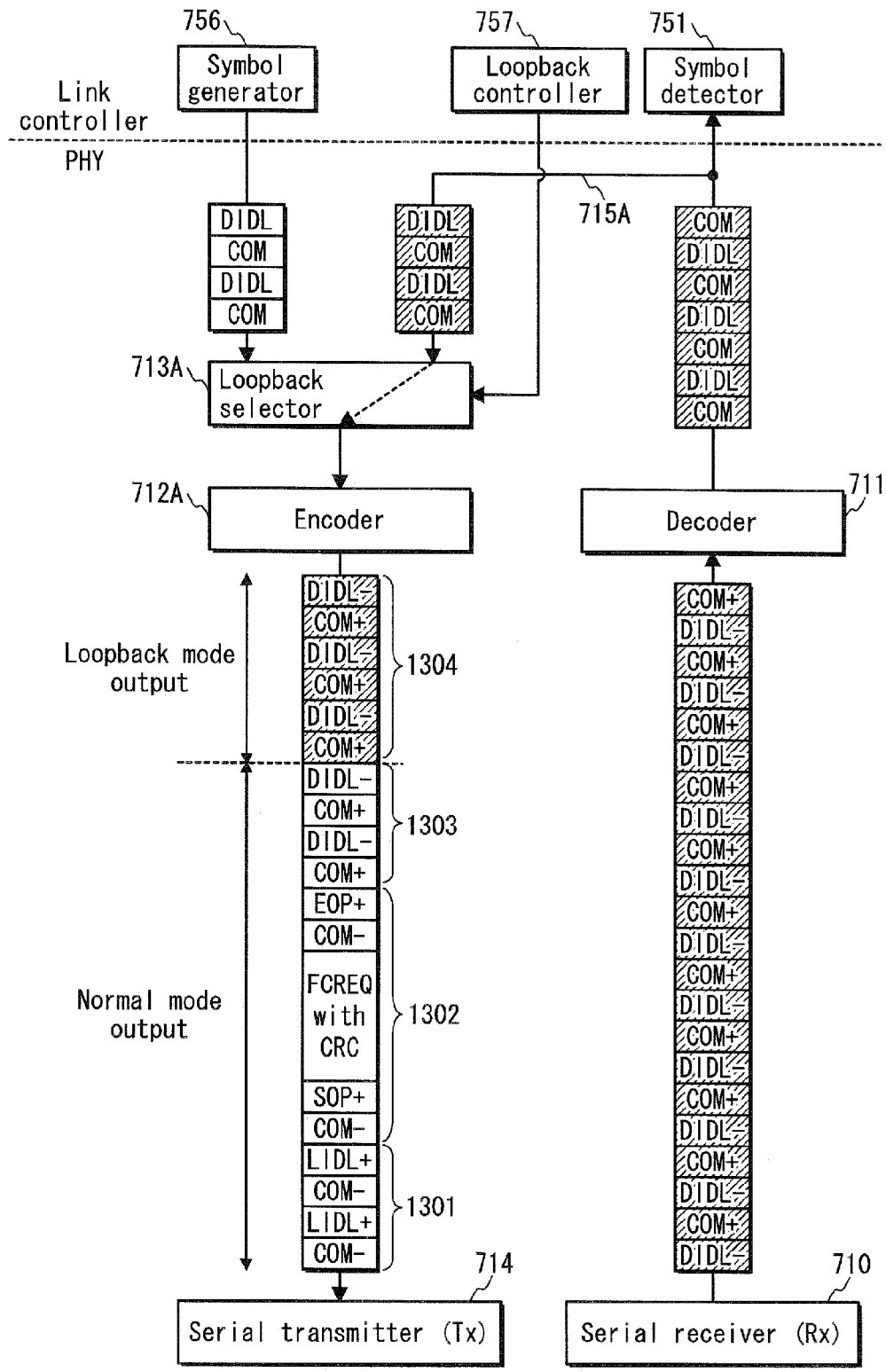
FIG. 14 illustrates the timing of output switching occurring before and after loopback mode transition by a loopback selector from a variation of the Embodiment.

As such, when the running disparity of the COM symbols in LIDL control symbol sets and DIDL control symbol sets is defined as randomly switching, the loopback selector 713 must perform output switching when the running disparity of the COM symbols in the DIDL control symbol sets of the parallel transmit data matches that of the COM symbols in the DIDL control symbol sets of the parallel loopback data. However, given that the running disparity of the COM symbols in such DIDL control symbol sets switches randomly, a matching time cannot be guaranteed. Thus, a loopback path 715A may be arranged after the decoder 711, as shown in FIG. 14. In such circumstances, a loopback selector 713A performs switching between the decoded parallel loopback data and the parallel transmit data (the raw transmit data input to the PHY from the link controller) input from the symbol generator 756 before encoding. The output of the loopback selector 713A is thus input to an encoder 712A. The encoder 712A then encodes the output of the loopback selector 713A in accordance with the 8b/10b scheme. However, when the position of the COM symbol is offset by one symbol between the unencoded parallel transmit data and the decoded parallel loopback data, the loopback selector 713A may internally delay the decoded parallel loopback data by one symbol before output. In such circumstances, the running disparity is normally managed by the encoder 712A. There is thus no need to take running disparity continuity into consideration.

Next, in a data burst relay step, the non-communication party slave device maintains loopback mode while relaying the data burst through the loopback path 715 (step S303). During the data burst relay step, the non-communication party slave device performs data burst relay processing with no involvement by the link controller 702. However, the symbol detector 751 of the non-communication party slave device handles the relevant operations and detects the EDB symbol indicating the end of the data burst. Once the symbol detector 751 detects the EDB symbol, the processing moves on to step S304, which is a normal mode recovery step.

During the normal mode recovery step, given that the EDB symbol detection is followed by the postgap 1101 shown in FIG. 11 or by the postgap 1201 shown in FIG. 12 for the non-communication party slave device having detected the EDB symbol, the symbol generator 756 makes a transmission instruction to the PHY 701 of a DIDL control symbol set serving as the first idle frame. Accordingly, the encoder 712 begins and repeatedly outputs DIDL control symbol sets as the first idle frame. The loopback controller 757 of the non-communication party slave device then makes a recovery instruction to the loopback selector 713 for recovering from loopback mode to normal mode. The loopback selector 713 switches the output from parallel loopback data to parallel transmit data such that a DIDL control symbol set output as the first idle frame by the encoder 712 is output to the serial link (step S304).

Figure 15:
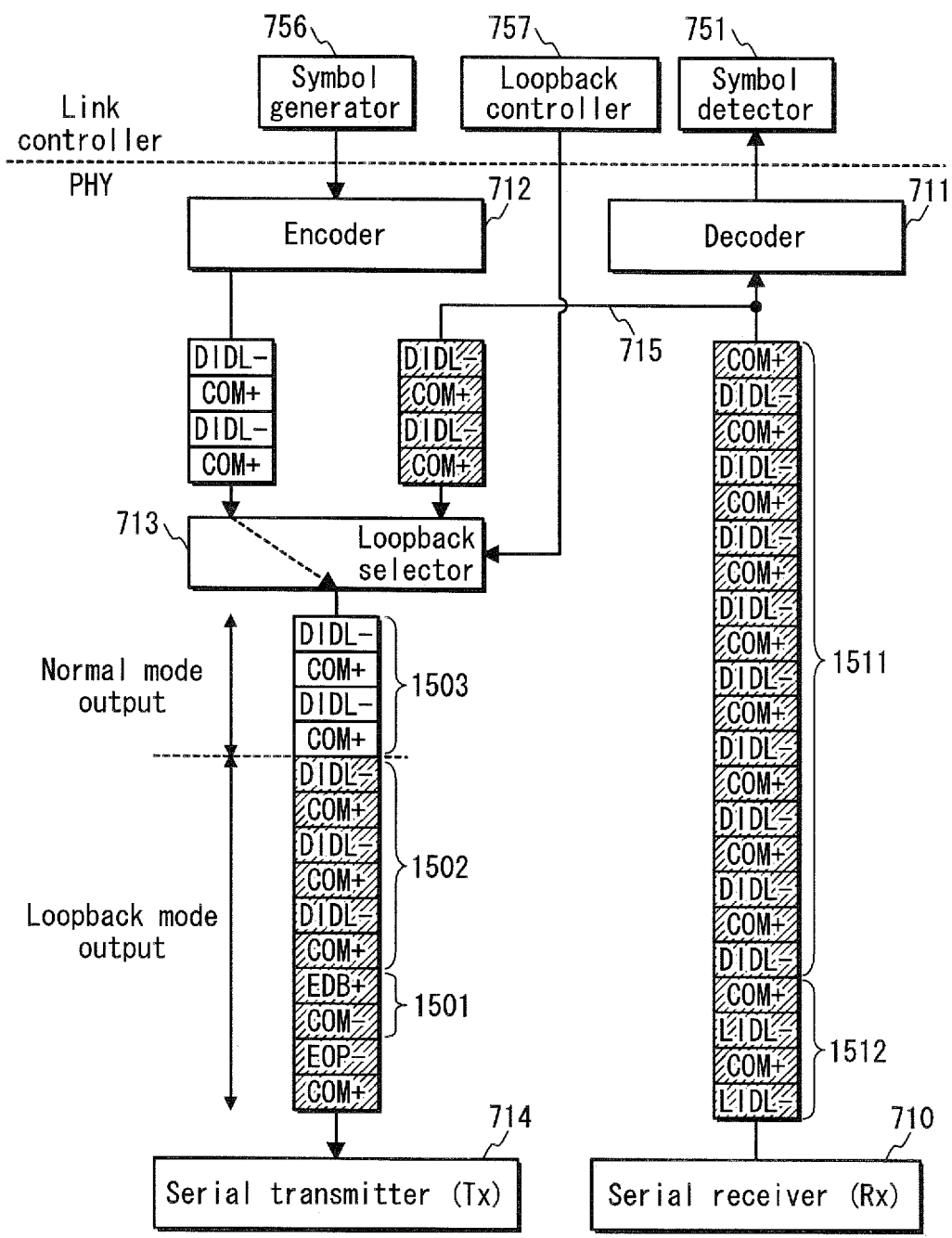
FIG. 15 illustrates the timing of output switching occurring before and after normal mode recovery by a loopback selector from FIG. 7.

The following describes the details of timing the output switch of the loopback selector 713 before and after the normal mode recovery, with reference to FIG. 15. FIG. 15 illustrates the timing of output switching occurring before and after the normal mode recovery of the loopback selector 713 from FIG. 7.

Upon detecting the EDB symbol input from the decoder 711, the symbol detector 751 notifies the loopback controller 757 and the symbol generator 756 to such effect. Accordingly, the loopback controller 757 makes a recovery instruction to the loopback selector 713 to recover normal mode from loopback mode. Also, the symbol generator 756 makes a transmission instruction to the encoder 712 for a DIDL control symbol set with a COM symbol having the same running disparity as the COM symbol of the DIDL control symbol set following EDB symbol detection. The encoder 712 outputs such a DIDL control symbol set in accordance with the transmission instruction from the symbol generator 756. Upon receiving the recovery instruction from the loopback controller 757 after relaying an EDB control symbol set 1501 and a DIDL control symbol set 1502 input via the loopback path 715, the loopback selector 713 performs normal mode recovery by switching the output from parallel loopback data to parallel transmit data. The non-communication party slave device then begins to output the DIDL control symbol set 1503 generated by the encoder 712 to the serial link. When the position of the COM symbol is offset by one symbol between the parallel loopback data and the parallel transmit data, the loopback selector 713 may internally delay the parallel transmit data by one symbol before output. Also, given that the DIDL control symbol set 1502 output by the encoder 712 has the same running disparity as the DIDL control symbol set 1503 relayed while in loopback mode, the continuity of the running disparity is maintained before and after loopback selector 713 output switching.

The following describes an example in which the symbol generator 756 is configured to make a transmission instruction to the encoder 712 for a DIDL control symbol set with a COM symbol having the same running disparity as the COM symbol of the DIDL control symbol set following EDB symbol detection.

The decoder 711 manages the running disparity (RD+ or RD−) and outputs the post-decoding running disparity to the symbol detector 751 along with decoding results. The symbol detector 751 detects the EDB symbol in the input from the decoder 711, then notifies the symbol generator 756 of EDB symbol detection and of the running disparity after EDB symbol detection. Upon receiving the EDB symbol detection notification, the symbol generator 756 makes a transmission instruction to the encoder 712 for the DIDL control symbol set including the EDB symbol having the post-decoding running disparity. The encoder 712 performs encoding in accordance with 8b/10b replacing the running disparity being managed with the running disparity of the notification, and outputs the DIDL control symbol set to the loopback selector 713.

When the loopback selector 713A is arranged after the decoder 711 similarly to the configuration illustrated in FIG. 14 and the output of the loopback selector 713A is input to the encoder 712A, there is no need to consider the continuity of the running disparity of symbols in the DIDL control symbol sets output in loopback mode and of the DIDL control symbol sets output in normal mode, before and after normal mode recovery.

In a postgap completion wait step, the symbol detector 751 of the non-communication party slave device detects whether a received symbol has switched from a postgap DIDL control symbol set to a LIDL control symbol set from a packet gap or to an electrical idle set. Upon receiving the detection, the symbol generator 756 changes the instruction for the PHY 701 from a transmission instruction of a DIDL control symbol set to a transmission instruction of a LIDL control symbol, or to a transmission disable instruction for entering the electrical idle state (step S305). In the sequence of FIG. 15, once the output of the serial receiver 710 is detected by the symbol detector 751 as having changed from the postgap DIDL control symbol set 1511 to the packet gap LIDL control symbol set 1512, the output of the symbol generator 756 in normal mode is subsequently switched from DIDL control symbol sets to LIDL control symbol sets.

When the EDB symbol cannot be detected during the normal mode recovery step (step S304) due to a transmission error or the like, recovery from loopback mode to normal mode cannot occur and subsequent packets are not received. In order to avoid such a situation, the loopback controller 757 preferably makes a recovery instruction to the loopback selector 713 for switching to normal mode from loopback mode when the change from the DIDL control symbol set to the LIDL control symbol set or to the electrical idle state is detected, despite the lack of EDB symbol detection.

(Overall Operations of Ring Transmission System)

Figure 16:
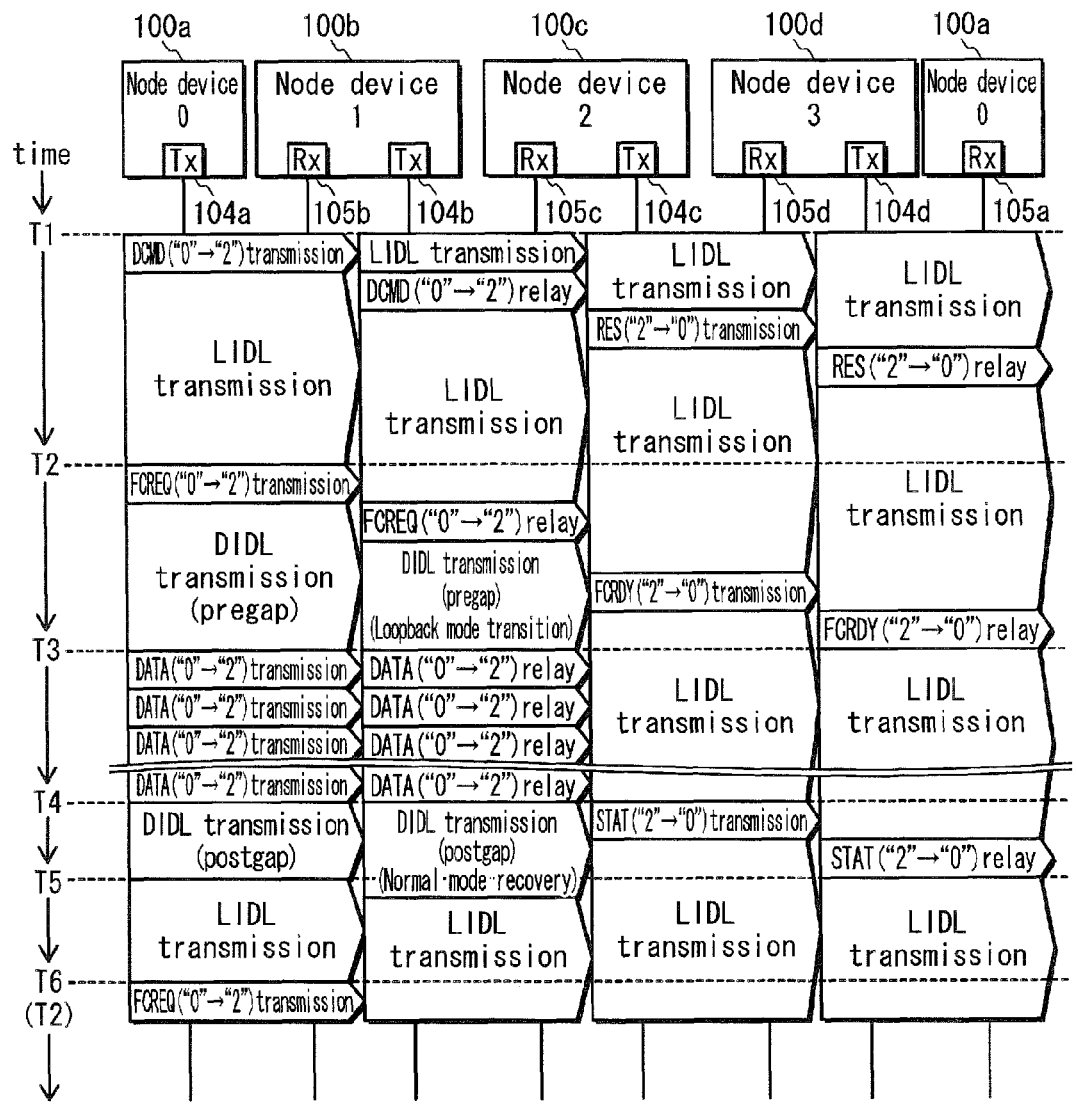
FIG. 16 illustrates the overall operations pertaining to write data commands occurring in the ring transmission system from FIG. 1.
Figure 17:
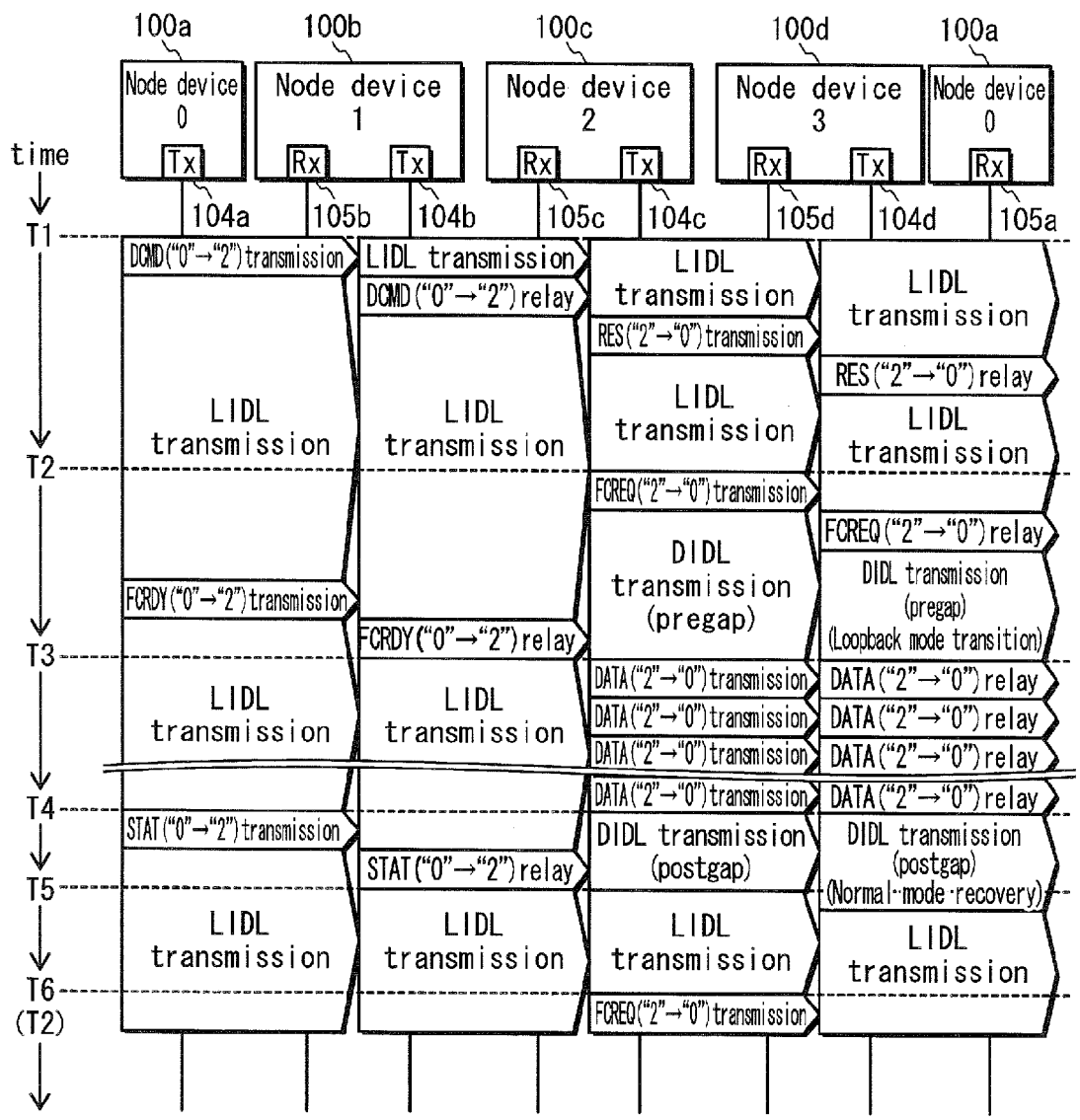
FIG. 17 illustrates the overall operations pertaining to read data commands occurring in the ring transmission system from FIG. 1.

The following describes the overall operations of the ring transmission system from FIG. 1, with reference to FIGS. 16 and 17.

FIG. 16 illustrates the overall operations of the ring transmission system from FIG. 1 pertaining to write data command processing. FIG. 17 illustrates the overall operations of the ring transmission system from FIG. 1 pertaining to read data command processing.

In FIGS. 16 and 17, each node device 100a through 100d is assigned a device ID of 0 through 3.

Node device 100a, being the master device (device ID=0), performs data transfers with a slave device (the node device designated by the destination ID 211 of the data command), which is node device 100c (device ID=2). As such, slave device 100b (device ID=1) and slave device 100d (device ID=3) serve as packet repeaters performing transmission and reception between node device 100a (the master device) and node device 100c (the communication party slave device). Also, during the initialization step S100 or S200, the power saving settings of all node devices 100a through 100d are made inactive, and a LIDL control symbol set serving as the second idle frame is repeatedly transmitted during the packet gaps.

In FIGS. 16 and 17, ("0"→"2") indicates a packet having device ID 2 set as the destination ID 211 and having device ID 0 set as the source ID 212. Similarly, ("2"→"0") indicates a packet having device ID 0 set as the destination ID 211 and having device ID 2 set as the source ID 212.

Write Data Command Operations

First, the overall operations of the ring transmission system from FIG. 1 pertaining to write data commands as illustrated by FIG. 16 are explained.

(Time T1 to Time T2)

During the packet gap, the node devices 100a through 100d repeatedly transmit a LIDL control symbol set serving as the second idle frame. At time T1, which occurs during the data command transmission step, node device 100a transmits a write data command packet (DCMD) addressed to node device 100c. The data command packet is input to node device 100b via serial link 101a. During the packet gap following data command packet transmission, node device 100a repeatedly transmits a LIDL control symbol set.

During the data command reception wait step, node device 100b receives the data command packet and determines that the received data command packet is addressed to another device (to node device 100c). Thus, during a packet relay step, node device 100b performs relay processing on the data command packet using the bypass path 758 in the link controller 702. The data command packet having undergone relay processing is input to node device 100c via serial link 101b. During the packet type determination step, node device 100b determines that the packet is not a flow control request message packet indicating a transmission request and returns to the data command reception wait step. During the packet gap following data command packet relay, node device 100a repeatedly transmits a LIDL control symbol set.

During the data command reception wait step, node device 100c receives the data command packet and determines that the received data command packet is addressed to the receiving device. Then, during the response transmission step, node device 100c transmits a response packet (RES) addressed to node device 100a. The response packet is input to node device 100d via serial link 101c. During the packet gap following response transmission, node device 100c repeatedly transmits a LIDL control symbol set.

During the data command reception wait step, node device 100d receives the response packet and determines that the received response packet is addressed to another device (node device 100a). Then, during the packet relay step, node device 100d performs relay processing on the response packet so addressed using the bypass path 758 in the link controller 702. The relayed response packet is input to node device 100a via serial link 101d. During the packet type determination step, node device 100d determines that the packet is not a flow control request message packet indicating a transmission request and returns to the data command reception wait step. During the packet gap following response packet transmission, node device 100d repeatedly transmits a LIDL control symbol set.

During the response reception wait step, node device 100a receives the response packet.

(Time T2 to Time T3)

During the data transmitter determination step, node device 100a, having received the response packet, determines itself as being the data burst transmitter and communication party node device 100c determines itself as not being the data burst transmitter (i.e., as being the data burst receiver).

During the transmission request step, node device 100a begins data transmission preparations. At time T2, when data transmission preparations are complete, node device 100a transmits a flow control request (FCREQ) message packet addressed to node device 100c indicating a transmission request. The flow control request message packet is input to node device 100b via serial link 101a. Given that the pregap occurs after flow control request message packet transmission, node device 100a repeatedly transmits DIDL control symbol sets.

During the data command reception wait step, node device 100b receives the flow control request message packet and determines that the received flow control request message packet is addressed to another device (node device 100c). Then, during the packet relay step, node device 100b performs relay processing on the flow control request message packet using the bypass path 758 in the link controller 702. The flow control request message packet having undergone relay processing is input to node device 100c via serial link 101b. During the packet type determination step, node device 100b determines that the packet is a flow control request message packet indicating a transmission request. Node device 100b then moves on to the loopback transition step and transitions from normal mode to loopback mode during the pregap following the relay processing of the flow control request message packet. After relaying the flow control request message packet, node device 100b repeatedly outputs DIDL control symbol sets generated thereby to serial link 101b until the pregap preceding the switch to loopback mode.

Then, during the pregap following the switch to loopback mode, node device 100b relays and outputs the DIDL control symbol set to serial link 101b using the loopback path 715.

During the transmission request wait step, node device 100c receives the flow control request message packet indicating the transmission request and thus completes data reception preparations. Then, in the transmission response step, node device 100c transmits a flow control ready (FCRDY) message packet addressed to node device 100a and indicating the transmission response. The flow control ready message packet is input to node device 100d via serial link 101c. During the packet gap following flow control ready message packet transmission, node device 100c repeatedly transmits LIDL control symbol sets.

During the data command reception wait step, node device 100d receives the flow control ready message packet and determines that the received flow control ready message packet is addressed to another device (node device 100a). Then, during the packet relay step, node device 100d performs relay processing on the flow control ready message packet using the bypass path 758 in the link controller 702. The relayed flow control ready message packet is input to node device 100a via serial link 101d. During the packet type determination step, node device 100d determines that the packet is not a flow control request message packet indicating a transmission request and returns to the data command reception wait step. During the packet gap following flow control ready message packet relay, node device 100d repeatedly transmits LIDL control symbol sets.

During the transmission response wait step, node device 100a receives the flow control ready message packet indicating the transmission response.

(Time T3 to Time T4)

Having received the flow control ready message packet indicating the transmission response, node device 100a begins to transmit the data burst as of time T3, during the data burst transmission step. The data burst is input to node device 100b via serial link 101a. Given that a postgap occurs after data burst transmission is complete, node device 100a repeatedly transmits DIDL control symbol sets.

During the data burst relay step, node device 100b, which is in loopback mode, performs relay processing on the data burst using the loopback path 715 of the PHY 701. The data burst having undergone relay processing is input to node device 100c via serial link 101b. In the normal mode recovery step during the postgap following EDB signal detection that indicates the end of the data burst, node device 100b recovers normal mode from loopback mode.

During the data burst reception wait step, node device 100c begins data burst reception.

(Time T4 to Time T5)

During the status notification step after data burst reception is complete, node device 100c transmits a status (STAT) message packet at time T4 notifying node device 100a of any reception errors. The status message packet is input to node device 100d via serial link 101c. Given that a packet gap occurs after status message packet transmission, node device 100c repeatedly transmits LIDL control symbol sets.

During the data command reception wait step, node device 100d receives the status message packet and determines that the status message packet is addressed to another device (node device 100a). Then, during the packet relay step, node device 100d performs relay processing on the status message packet using the bypass path 758 in the link controller 702. The relayed status message packet is input to node device 100a via serial link 101d. During the packet type determination step, node device 100d determines that the packet is not a flow control request message packet indicating a transmission request and returns to the data command reception wait step. Given that a packet gap occurs after status message packet relay, node device 100d repeatedly transmits LIDL control symbol sets.

(Time T5 to Time T6)

During the status notification wait step, node device 100a receives the status message packet, ends the postgap at time T5 when the status message packet is received, and switches from transmitting DIDL control symbol sets to transmitting LIDL control symbol sets in the normal packet gaps.

During the postgap completion wait step, once the symbol detector 751 detects the switch from DIDL control symbol sets to LIDL control symbol sets, node device 100b completes the postgap and switches from transmitting DIDL control symbol sets to transmitting LIDL control symbol sets.

(Time T6 Onward)

During the command completion determination step, node device 100a returns to the transmission request step and repeats the processing as of time T2 until a data transfer equivalent to the transfer size designated by the data command is determined as being complete.

Read Data Command Operations

Next, the overall operations of the ring transmission system from FIG. 1 pertaining to read data commands as illustrated by FIG. 17 are explained.

(Time T1 to Time T2)

The operations of the ring transmission system from time T1 to time T2 are similar to those described above, differing only in that the write command is changed to a read command.

(Time T2 to Time T3)

During the data transmitter determination step, node device 100a having received the response packet determines itself as not being the data transmitter (i.e., as being the data receiver), and communication party node device 100c determines itself as being the data transmitter.

During the transmission request step, node device 100c begins data transmission preparations. At time T2, when data transmission preparations are complete, node device 100c transmits a flow control request (FCREQ) message packet addressed to node device 100a indicating a transmission request. The flow control request message packet is input to node device 100d via serial link 101c. Given that the pregap occurs after flow control request message packet transmission, node device 100c repeatedly transmits DIDL control symbol sets.

During the data command reception wait step, node device 100d receives the flow control request message packet and determines that the received flow control request message packet is addressed to another device (node device 100a). Then, during the packet relay step, node device 100d performs relay processing on the flow control request message packet using the bypass path 758 in the link controller 702. The flow control request message packet having undergone relay processing is input to node device 100a via serial link 101d. During the packet type determination step, node device 100d determines that the relayed packet is a flow control request message packet indicating a transmission request. Node device 100d then moves on to the loopback transition step and transitions from normal mode to loopback mode during the pregap following the relay processing of the flow control request message packet. After relaying the flow control request message packet, node device 100d repeatedly outputs DIDL control symbol sets generated thereby to serial link 101d during the pregap preceding the switch to loopback mode. Then, during the pregap following the switch to loopback mode, node device 100*d* relays and outputs the DIDL control symbol set to serial link 101*d* using the loopback path 715.

During the transmission request wait step, node device 100*a* receives the flow control request message packet indicating the transmission request and thus completes data reception preparations. Then, in the transmission response step, node device 100*a* transmits a flow control ready (FCRDY) message packet addressed to node device 100*c* and indicating the transmission response. The flow control ready message packet is input to node device 100*b* via serial link 101*a*. During the packet gap following flow control ready message packet transmission, node device 100*a* repeatedly transmits LIDL control symbol sets.

During the data command reception wait step, node device 100*b* receives the flow control ready message packet and determines that the received flow control ready message packet is addressed to another device (node device 100*c*). Then, during the packet relay step, node device 100*b* performs relay processing on the flow control ready message packet using the bypass path 758 in the link controller 702. The flow control ready message packet having undergone relay processing is input to node device 100*c* via serial link 101*b*. During the packet type determination step, node device 100*b* determines that the relayed packet is not a flow control request message packet indicating a transmission request and returns to the data command reception wait step. During the packet gap following flow control ready message packet transmission, node device 100*b* repeatedly transmits LIDL control symbol sets.

During the transmission response wait step, node device 100*c* receives the flow control ready message packet indicating the transmission response.

(Time T3 to Time T4)

Having received the flow control ready message packet indicating the transmission response, node device 100*c* begins to transmit the data burst as of time T3, during the data burst transmission step. The data burst is input to node device 100*d* via serial link 101*c*. Given that a postgap occurs after data burst transmission is complete, node device 100*c* repeatedly transmits DIDL control symbol sets.

During the data burst relay step, node device 100*d*, which is in loopback mode, performs relay processing on the data burst using the loopback path 715 of the PHY 701. The data burst having undergone relay processing is input to node device 100*a* via serial link 101*d*. In the normal mode recovery step during the postgap following EDB signal detection that indicates the end of the data burst, node device 100*d* recovers normal mode from loopback mode.

During the data burst reception wait step, node device 100*a* begins data burst reception.

(Time T4 to Time T5)

During the status notification step after data burst reception is complete, node device 100*a* transmits a status (STAT) message packet at time T4 notifying node device 100*c* of any reception errors. The status message packet is input to node device 100*b* via serial link 101*a*. Given that a packet gap occurs after status message packet transmission, node device 100*a* repeatedly transmits LIDL control symbol sets.

During the data command reception wait step, node device 100*b* receives the status message packet and determines that the status message packet is addressed to another device (node device 100*c*). Then, during the packet relay step, node device 100*b* performs relay processing on the status message packet using the bypass path 758 in the link controller 702. The relayed status message packet is input to node device 100*c* via serial link 101*b*. During the packet type determination step, node device 100*b* determines that the relayed packet is not a flow control request message packet indicating a transmission request and returns to the data command reception wait step. Given that a packet gap occurs after status message packet relay, node device 100*b* repeatedly transmits LIDL control symbol sets.

(Time T5 to Time T6)

During the status notification wait step, node device 100*c* receives the status message packet, ends the postgap at time T5 when the status message packet is received, and switches from transmitting DIDL control symbol sets to transmitting LIDL control symbol sets in the normal packet gaps.

During the postgap completion wait step, node device 100*d* is notified by the symbol detector 751 to switch from DIDL control symbol sets to LIDL control symbol sets. Thus, node device 100*d* completes the postgap and switches from transmitting DIDL control symbol sets to transmitting LIDL control symbol sets.

(Time T6 Onward)

During the command completion determination step, node device 100*c* returns to the transmission request step and repeats the processing as of time T2 until a data transfer equivalent to the transfer size designated by the data command is determined as being complete.

[Variations]

The present invention is not limited to the above-described Embodiment, and may also be realized as any of several variations achieving the stated aim, as well as related or additional aims. For example, the following variations are possible.

Figure 18:
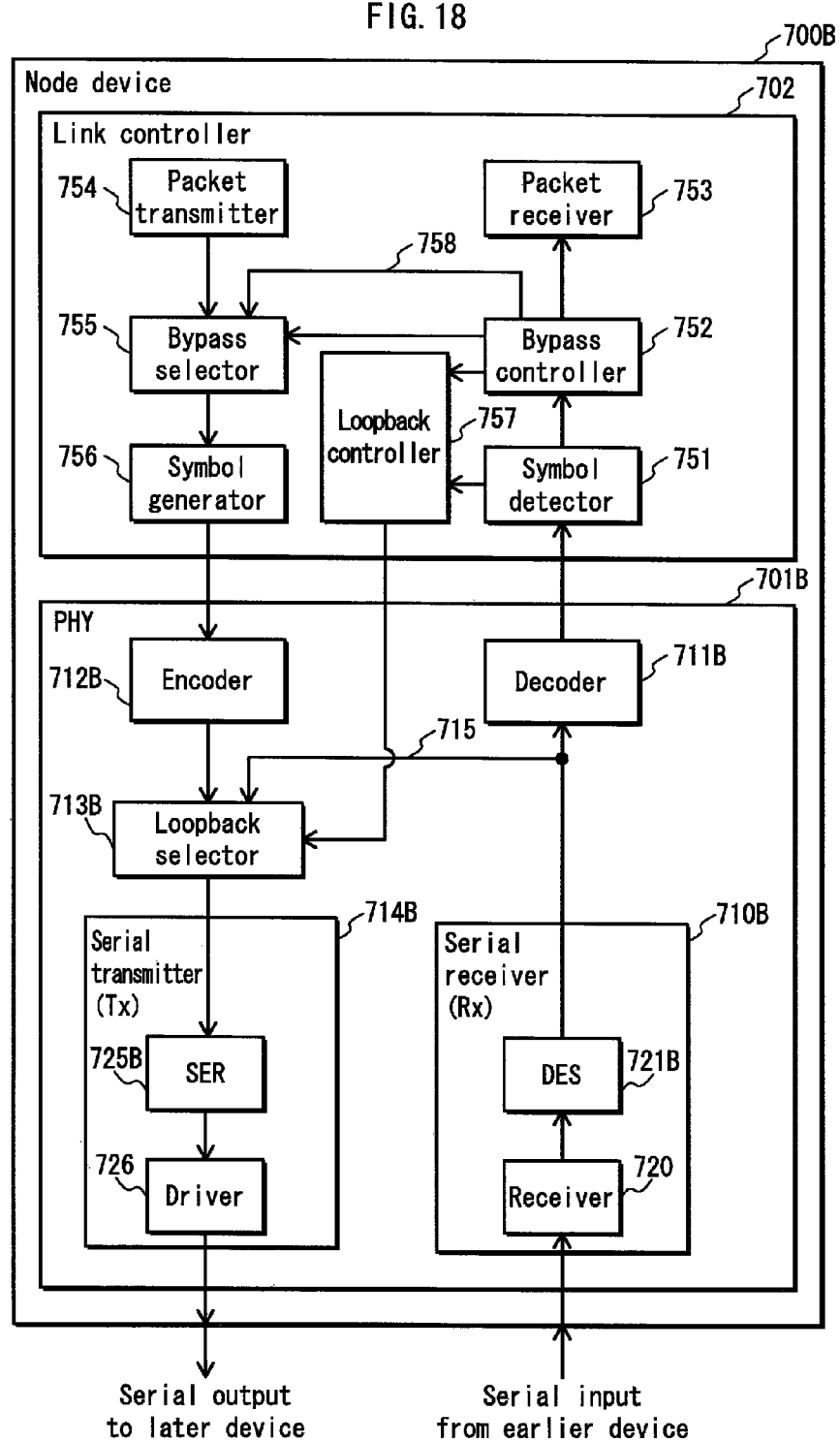
FIG. 18 is a configuration diagram of a node device using 64b/66b.

(1) Although the above-described Embodiment explains a situation where 8b/10b is used as the encoding method, no such limitation is intended. A scrambling method such as 64b/66b may also be used. For example, FIG. 18 illustrates the configuration of a node device using 64b/66b.

The symbol generator 756 outputs a 64-bit word made up of a bundle of eight symbols (8 bytes) in the 8b/10b scheme as raw transmit data to the encoder 712B. The encoder 712B then performs scrambling on the 64-bit wide raw transmit data with a predetermined scrambling polynomial and affixes a two-bit synchronization header to generate parallel transmit data conforming to encoded 64b/66b for output to the loopback selector 713B.

The loopback selector 713B receives instructions from the loopback controller 757, switches between output selections with predetermined timing, and outputs either the parallel transmit data or the parallel loopback data to the serial transmitter 714B.

The serializer 725B of the serial transmitter 714B converts the 64b/66b parallel transmit data or parallel loopback data input from the loopback selector 713B into serial transmit data or serial loopback data.

The deserializer 721B of the serial receiver 710B detects the synchronization header in continuous 66-bit width serial receive data, thereby achieving symbol lock (frame lock), and outputs 64b/66b parallel receive data to the decoder 711B. The decoder 711B removes the synchronization header affixed to the parallel receive data and applies a descrambling polynomial corresponding to the scrambling polynomial used by the encoder 712B, thereby generating descrambled 64-bit width received raw data for output to the symbol detector 751.

When using 64b/66b, the loopback selector 713B must select, during normal mode, the 64b/66b parallel transmit data input from the encoder 712B for output, and during loopback mode, must select the 64b/66b parallel loopback data input via the loopback path 715.

Figure 19:
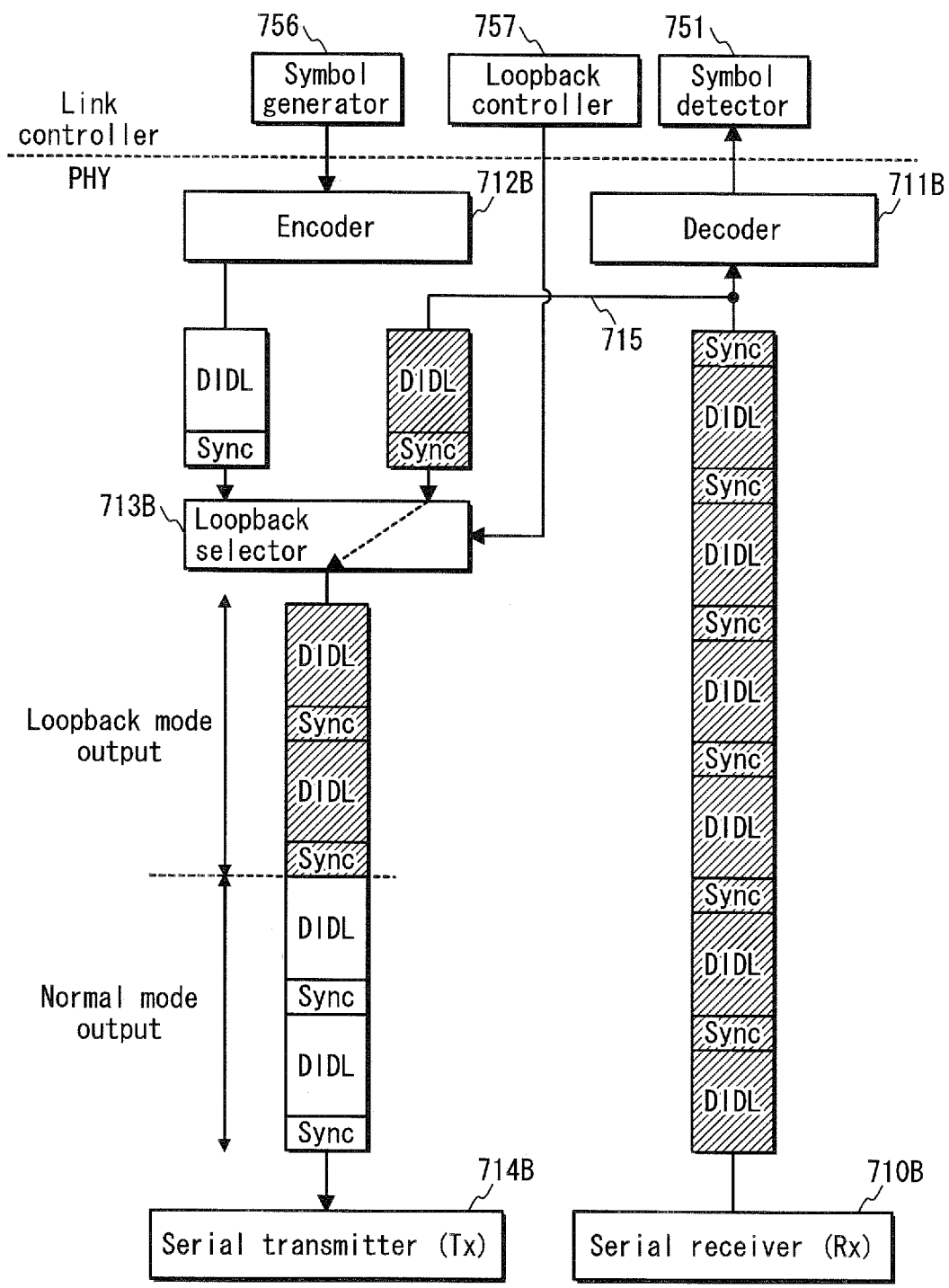
FIG. 19 illustrates the timing of output switching occurring before and after loopback mode transition by a loopback selector using 64b/66b.
Figure 20:
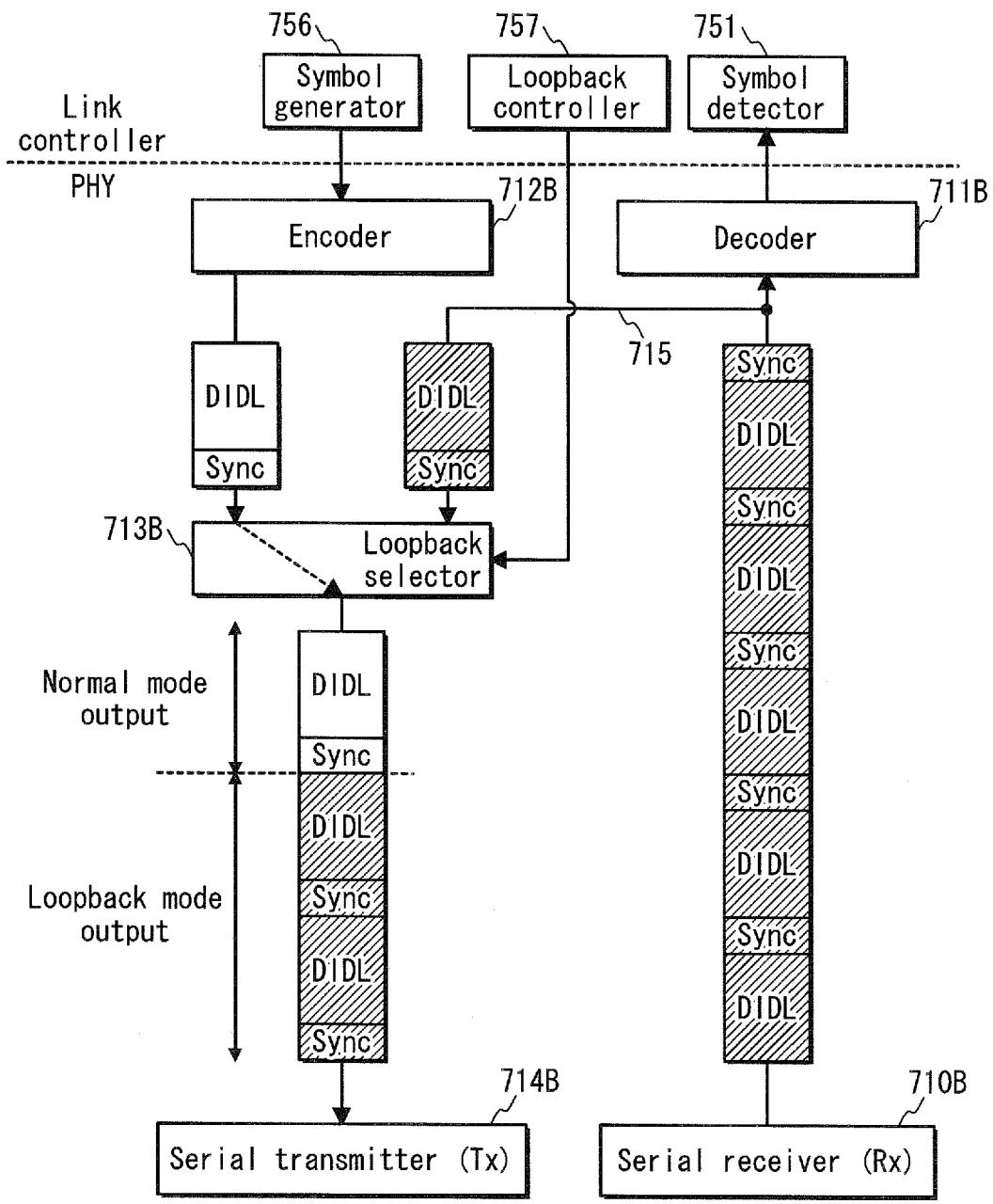
FIG. 20 illustrates the timing of output switching occurring before and after normal mode recovery by a loopback selector using 64b/66b.

The following describes the respective timing of output switching by the loopback selector 713B before and after transition to loopback mode and of output switching by the loopback selector 713B before and after normal mode recovery when 64b/66b is used, with reference to FIGS. 19 and 20.

FIG. 19 illustrates the timing of output switching by the loopback selector 713B before and after transition to loopback mode when 64b/66b is used as the encoding scheme. Given that 64b/66b allows the use of all control symbols corresponding to the 8b/10b control symbols given by FIG. 4, the 64b/66b parallel data made up of DIDL symbols is indicated as DIDL.

While in normal mode, the loopback selector 713B outputs the 64b/66b parallel transmit data input from the encoder 756. When the received packet is addressed to another device and is a flow control request message packet indicating a transmission request, the loopback controller 757 makes a transition instruction to the loopback selector 713B to switch from normal mode to loopback mode. Upon receiving the transition instruction, the loopback selector 713B transitions from normal mode to loopback mode and switches output from the 64b/66b parallel transmit data input from the encoder 712B to the 64b/66b parallel loopback data input via the loopback path 715. By performing this output switch at a timing conforming to the positions of the synchronization header (sync) added to each of the parallel transmit data and the parallel loopback data, data continuity is preserved before and after switching. When the position of the synchronization header (sync) is offset between the parallel transmit data and the parallel loopback data, the loopback selector 713B may internally delay the parallel loopback data as appropriate to match the synchronization header (sync) position.

FIG. 20 illustrates the timing of output switching by the loopback selector 713B before and after normal mode recovery when 64b/66b is used as the encoding scheme.

While in loopback mode, the loopback selector 713B outputs the 64b/66b parallel loopback data input via the loopback path 715. When an EDB symbol is detected, the loopback controller 757 makes a recovery instruction to the loopback selector 713B for recovering normal mode from loopback mode. Upon receiving the recovery instruction, the loopback selector 713B recovers normal mode from loopback mode and switches the output from the 64b/66b parallel loopback data input via the loopback path 715 to the 64b/66b parallel transmit data input from the encoder 712B. By performing this output switch at a timing conforming to the positions of the synchronization header (sync) added to each of the parallel transmit data and the parallel loopback data, data continuity is preserved before and after switching. When the position of the synchronization header (sync) is offset between the parallel transmit data and the parallel loopback data, the loopback selector 713B may internally delay the parallel transmit data as appropriate to match the synchronization header (sync) position.

When a transmission error or similar occurs due to no EDB symbol being detected, the recovery of normal mode from loopback mode does not occur, and subsequent packets are not receivable. In order to avoid such a situation, the loopback controller 757 preferably makes the recovery instruction to the loopback selector 713 for switching to normal mode from loopback mode when the change from the DIDL control symbol set to the LIDL control symbol set or to the electrical idle state is detected, despite the lack of EDB symbol detection.

In this variation of Embodiment 1, the operations of the node devices 100a through 100d are substantially identical to those shown in the flowcharts of FIGS. 8, 9, and 10, and the overall operations of the ring transmission system are substantially identical to those shown in the flowcharts of FIGS. 16 and 17. The explanations thereof are here omitted.

(2) Although the above-described Embodiment discusses an example in which the control symbol sets given in FIG. 5 are used, the invention is not limited in this manner. As described in the Embodiment, the control symbol sets are not limited to the control symbol sets defined in FIG. 5.

The following describes the output switching rules of the loopback selector when the LIDL control symbol set where the LIDL symbol is defined as being made up of an unequal number of zeroes and ones or as being made up of an equal number or zeroes and ones, and when the DIDL control symbol set where the DIDL symbol is defined as being made up of an unequal number of zeroes and ones or as being made up of an equal number or zeroes and ones, with reference to FIGS. 21 and 22A through 22C.

FIG. 21 is a table of sample control symbol sets used by the node device of FIG. 1 in the present variation.

FIG. 21 lists sample control symbol sets including a LIDL control symbol set made up of a COM symbol (K28.5) as the first symbol and a LIDL0 symbol (K28.3) as the second symbol, and a LIDL control symbol set made up of a COM symbol (K28.5) as the first symbol and a LIDL1 symbol (D16.7) as the second symbol.

Here, the LIDL0 symbol (K28.3) is a (binary) code symbol that may be 0011110011 for Current RD− or 1100001100 for Current RD+. The LIDL0 symbol (K28.3) is an unbalanced symbol having an unequal number of zeroes and ones. Therefore, the running disparity is subsequently reversed.

Here, the LIDL1 symbol (D16.7) is a (binary) code symbol that may be 0110110001 for Current RD− or 1001001110 for Current RD+. The LIDL1 symbol (D16.7) is a balanced symbol having an equal number of zeroes and ones. Therefore, the running disparity is not subsequently reversed.

The COM symbol (K28.5) is a (binary) code symbol that may be 0011111010 for Current RD− or 1100000101 for Current RD+. The COM symbol (K28.5) is an unbalanced symbol having an unequal number of zeroes and ones. Therefore, the running disparity is subsequently reversed.

According to the above-described rules, when LIDL0 symbols and LIDL1 symbols are selected at random, such as in the order COM+→LIDL0−→COM+→LIDL0−↛COM+ →LIDL1−→COM−↛LIDL1+→COM+→LIDL0−↛COM+ →LIDL0−, the running disparity of each COM symbol is maintained after each LIDL0 symbol but is reversed after each LIDL1 symbol.

As such, the running disparity of the COM symbols is also randomly switched, thereby improving the randomness of the data sequence and enabling radiation noise reduction.

FIG. 21 lists sample control symbol sets including a DIDL control symbol set made up of a COM symbol (K28.5) as the first symbol and a DIDL0 symbol (K28.6) as the second symbol, and a DIDL control symbol set made up of a COM symbol (K28.5) as the first symbol and a DIDL1 symbol (D12.2) as the second symbol.

Here, the DIDL0 symbol (K28.6) is a (binary) code symbol that may be 0011110110 for Current RD− or 1100001001 for Current RD+. The DIDL0 symbol (K28.6) is an unbalanced symbol having an unequal number of zeroes and ones. Therefore, the running disparity is subsequently reversed.

Also, the DIDL1 symbol (D12.2) is a (binary) code symbol that may be 0011010101 for Current RD− or 1100101010 for Current RD+. The DIDL1 symbol (D12.2) is a balanced symbol having an equal number of zeroes and ones. Therefore, the running disparity is not subsequently reversed.

According to the above-described rules, when DIDL0 symbols and DIDL1 symbols are selected at random, such as in the order COM+→DIDL0-→COM+→DIDL0-→COM+→DIDL1-→COM-→DIDL1+→COM+→DIDL0-→COM+→DIDL0-, the running disparity of each COM symbol is maintained after each LIDL0 symbol but is reversed after each LIDL1 symbol.

Figure 22A:
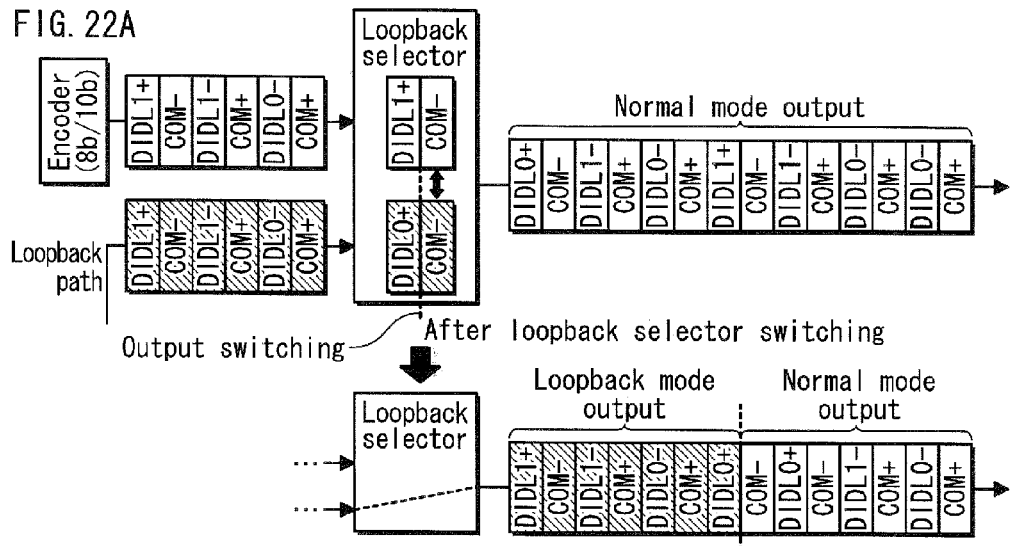
FIGS. 22A, 22B, and 22C illustrates output switching rules for the loopback selector when using the control symbol sets from FIG. 21.
Figure 22B:
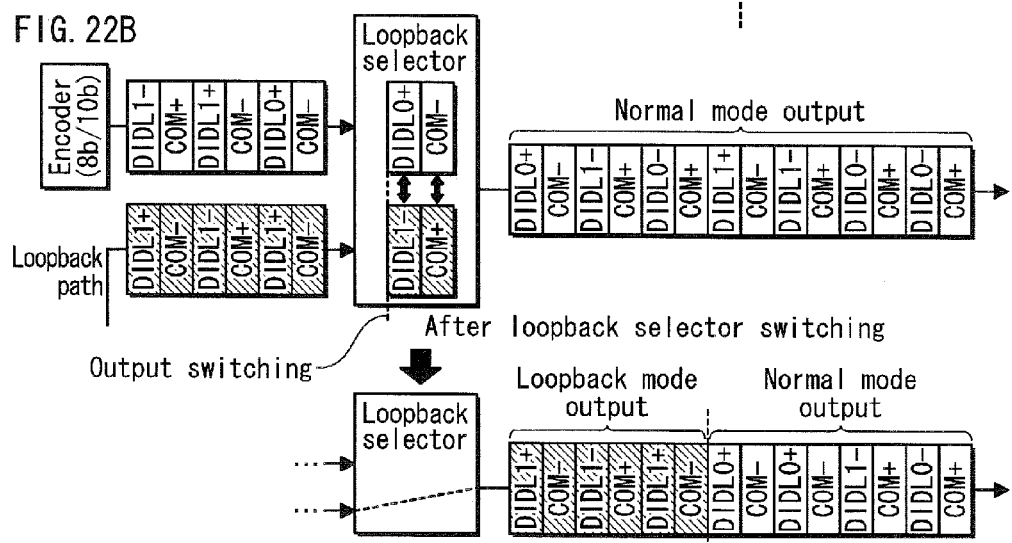
Figure 22C:
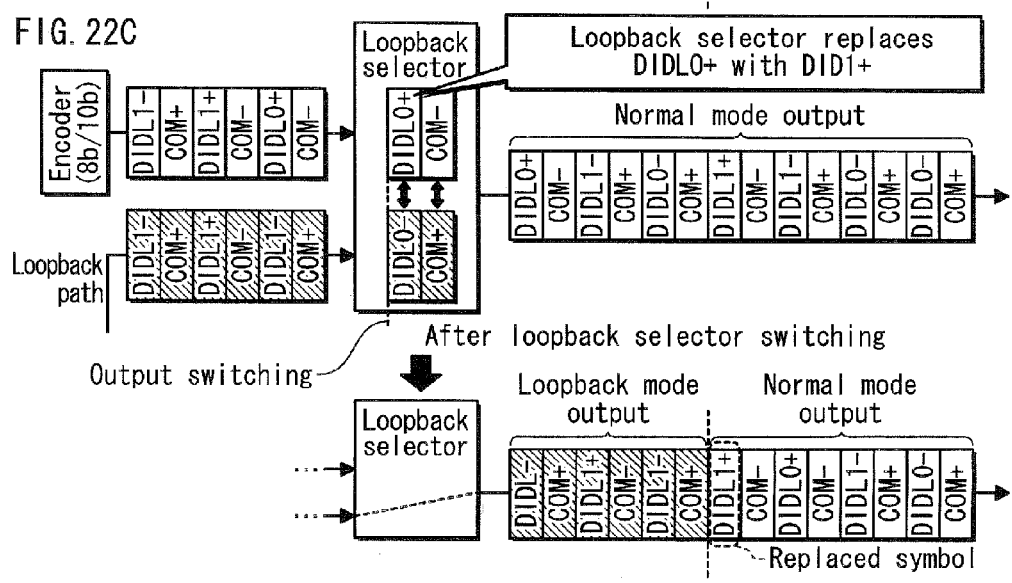

FIGS. 22A through 22C describe the output switching rules of the loopback selector before and after loopback mode when the DIDL control symbol set where the DIDL symbol is defined as being made up of an unequal number of zeroes and ones or as being made up of an equal number or zeroes and ones (e.g., the control symbol sets of FIG. 21).

(Rule A) As shown in FIG. 22A, when the running disparity of the COM symbol in the DIDL control symbol set generated by the encoder of the loopback selector matches the running disparity at the COM symbol in the DIDL control symbol set input via the loopback path thereof, the loopback selector switches output from parallel transmit data to parallel loopback data immediately after the matching COM symbol.

(Rule B) As shown in FIG. 22B, when the running disparity of the COM symbol in the DIDL control symbol set generated by the encoder of the loopback selector does not match the running disparity of the COM symbol in the DIDL control symbol set input via the loopback path thereof, and the COM symbol in the DIDL control symbol set generated by the encoder of the loopback selector is of a different type than the COM symbol in the DIDL control symbol set input via the loopback path thereof, the loopback selector switches the output from parallel transmit data to parallel loopback data immediately after the non-matching DIDL symbol.

(Rule C) As shown in FIG. 22C, when the running disparity of the COM symbol in the DIDL control symbol set generated by the encoder of the loopback selector does not match the running disparity of the COM symbol in the DIDL control symbol set input via the loopback path thereof, and the COM symbol in the DIDL control symbol set generated by the encoder of the loopback selector is of the same type as the COM symbol in the DIDL control symbol set input via the loopback path thereof, the loopback selector replaces the DIDL symbol generated by the encoder with the other symbol type for output, such that the running disparity of the DIDL symbol generated by the encoder remains as-is while the DIDL symbol is replaced with a different type of symbol. The loopback selector then switches the output from parallel transmit data to parallel loopback data immediately after the DIDL symbols of the same type.

When the DIDL symbol of the DIDL control symbol set is defined as being made up of an unequal number of zeroes and ones or as being made up of an equal number or zeroes and ones (e.g., the control symbol sets of FIG. 21), the loopback selector may perform output switching before and after normal mode recovery by using rules A, B, and C as described above. The symbol type replacement of rule C is performed on the DIDL symbol input via the loopback path.

Specifically, rules a, b, and c are obeyed, as follows.

(Rule a) When the running disparity of the COM symbol in the DIDL control symbol set generated by the encoder of the loopback selector matches the running disparity of the COM symbol in the DIDL control symbol set input via the loopback path thereof, the loopback selector switches output from parallel loopback data to parallel transmit data immediately after the matching COM symbol.

(Rule b) When the running disparity of the COM symbol in the DIDL control symbol set generated by the encoder of the loopback selector does not match the running disparity of the COM symbol in the DIDL control symbol set input via the loopback path thereof, and the COM symbol in the DIDL control symbol set generated by the encoder of the loopback selector is of a different type than the COM symbol in the DIDL control symbol set input via the loopback path thereof, the loopback selector switches the output from parallel loopback data to parallel transmit data immediately after the non-matching DIDL symbol.

(Rule c) When the running disparity of the COM symbol in the DIDL control symbol set generated by the encoder of the loopback selector does not match the running disparity of the COM symbol in the DIDL control symbol set input via the loopback path thereof, and the COM symbol in the DIDL control symbol set generated by the encoder of the loopback selector is of the same type as the COM symbol in the DIDL control symbol set input via the loopback path thereof, the loopback selector replaces the DIDL symbol input via the loopback path with the other symbol type for output, such that the running disparity of the DIDL symbol input via the loopback path remains as-is, while the DIDL symbol is replaced with a different type of symbol. The loopback selector then switches the output from parallel loopback data to parallel transmit data immediately after the DIDL symbols of the same type.

(3) The components of the node device of the above-described Embodiment and variations thereof may also be realized as an LSI integrated circuit. In such a case, each component may be realized separately on individual chips, or the components may be realized in whole or in part on a single chip. Alternatively, according to the degree of integration, the LSI may be named an IC, a system LSI, a super LSI, or an ultra LSI. Additionally, the integrated circuit method is not limited to LSI, but may also be realized as a private circuit or as a general-use processor. After LSI manufacture, a FPGA (Field Programmable Gate Array) or a reconfigurable processor connected or set up in circuit cells within the LSI may also be used. Furthermore, should integrated circuit technology appear that comes to replace LSI, the integration of function blocks using such technology is of course also possible.

INDUSTRIAL APPLICABILITY

The present invention is applicable to packet transmission and reception between a plurality of node devices connected in a ring through serial links, and enables provision of a node device, integrated circuit, and control method by which relay processing overhead is reduced while data transfer reliability is maintained.

REFERENCE SIGNS LIST

700 Node device
701 PHY
702 Link controller
710 Serial receiver
711 Decoder
712 Encoder
713 Loopback selector
714 Serial transmitter
720 Receiver
721 Deserializer
725 Serializer
726 Driver
751 Symbol detector
752 Bypass controller
753 Packet receiver
754 Packet transmitter
755 Bypass selector 756 Symbol generator
757 Loopback controller
758 Bypass path

The invention claimed is:

1. A node device in a ring transmission system in which a plurality of node devices are connected as a ring through serial links, comprising:
a link controller performing transmission, reception, and relay processing on a packet that includes destination information; and
a PHY switching a communication mode of operation between (i) a normal mode of performing interconversion between serial data input and output via the serial links and parallel data handled by the link controller, and (ii) a loopback mode of looping back the serial data input via an earlier serial link, before handover to the link controller, for output to a later serial link, wherein
the link controller includes:
a symbol generator making an idle frame transmission instruction for maintaining symbol lock to the PHY during a pregap between a transmission request packet and a data packet; and
a loopback controller making a transition instruction from the normal mode to the loopback mode to the PHY during the pregap and after the relay processing is performed in the normal mode on a transmission request packet addressed to another node device in order to cause a data packet addressed to the other node device to be looped back for output,
during the normal mode, the PHY outputs an idle frame to the later serial link in accordance with the transmission instruction from the symbol generator,
the PHY transitions from the normal mode to the loopback mode in accordance with the transition instruction with timing such that symbol lock is maintained between (i) the idle frame output to the later serial link in accordance with the transmission instruction during the normal mode, and (ii) an idle frame input from an earlier node device looped back for output to the later serial link during the loopback mode, and
during the loopback mode, the PHY loops back the idle frame from the earlier node device for output to the later serial link, and performs the relay processing on the data packet addressed to the other node device.

2. The node device of claim 1, wherein
the link controller hands over a data sequence pertaining to a control symbol set that begins with a comma symbol for symbol lock and that includes an idle symbol to the PHY as the transmission instruction,
the PHY outputs the idle frame during the normal mode through encoding of the data sequence pertaining to the control symbol set, and
the PHY transitions from the normal mode to the loopback mode in accordance with the transition instruction with timing such that (i) the idle frame output to the later serial link in accordance with the transmission instruction during the normal mode, and (ii) the idle frame from the earlier node device looped back for output to the later serial link during the loopback mode match in terms of comma symbol position and of running disparity.

3. The node device of claim 1, wherein
the link controller hands over a data sequence in which are bundled a plurality of idle symbols of predetermined word length to the PHY as the transmission instruction,
the PHY outputs the idle frame during the normal mode through encoding by (i) scrambling the data sequence according to a predetermined scrambling method (ii) and affixing a synchronization header to the head of each word of the predetermined word length for symbol lock, and
the PHY transitions from the normal mode to the loopback mode in accordance with the transition instruction with timing such that (i) the idle frame output to the later serial link in accordance with the transmission instruction during the normal mode, and (ii) the idle frame from the earlier node device looped back for output to the later serial link during the loopback mode match in terms of synchronization header position.

4. The node device of claim 1, wherein
the link controller hands over a data sequence pertaining to a control symbol set that begins with a comma symbol for symbol lock and that includes an idle symbol to the PHY as the transmission instruction,
the PHY includes:
an encoder generating and outputting the idle frame to be output to the later serial link during the normal mode through encoding of the data sequence pertaining to the control symbol set; and
a loopback selector selecting the idle frame output by the encoder for output to the later serial link during the normal mode, and selecting the idle frame from the earlier node device for output to the later serial link during the loopback mode,
the comma symbol of the idle frame is exclusively a type of symbol having an unequal number of zeroes and ones,
the idle symbol of the idle frame is a type of symbol having an unequal number of zeroes and ones, or is a type of symbol having an equal number of zeroes and ones,
when the comma symbol input from the encoder and the comma symbol input from the earlier node device match in terms of running disparity, the loopback selector switches output so as to transition from the normal mode to the loopback mode immediately after the matching comma symbols,
when the comma symbol input from the encoder and the comma symbol input from the earlier node device do not match in terms of running disparity, and an idle symbol following the comma symbol input from the encoder and an idle symbol following the comma symbol input from the earlier node device do not match in terms of symbol type, the loopback selector switches output so as to transition from the normal mode to the loopback mode immediately after the non-matching idle symbols, and
when the comma symbol input from the encoder and the comma symbol input from the earlier node device do not match in terms of running disparity, and the idle symbol following the comma symbol input from the encoder and the idle symbol following the comma symbol input from the earlier node device match in terms of symbol type, the loopback selector replaces the idle symbol following the comma symbol output from the encoder with a different type of symbol such that the running disparity remains as-is, and switches output so as to transition from the normal mode to the loopback mode immediately after the matching idle symbols.

5. The node device of claim 1, wherein
at initialization time, the link controller sets a power saving control of the PHY as active or inactive, and
during a packet gap preceding the pregap,
when the power saving control is active, the symbol generator makes a transmission disable instruction for placing the later serial link in an electrical idle state, and when the power saving control is inactive, the symbol generator makes another transmission instruction for maintaining symbol lock.

6. A node device in a ring transmission system in which a plurality of node devices are connected as a ring through serial links, comprising:
   a link controller performing transmission, reception, and relay processing on a packet that includes destination information; and
   a PHY switching a communication mode of operation between (i) a normal mode of performing interconversion between serial data input and output via the serial links and parallel data handled by the link controller, and (ii) a loopback mode of looping back the serial data input via an earlier serial link before handover to the link controller for output to a later serial link, wherein
   the link controller includes:
      a symbol generator making an idle frame transmission instruction to the PHY for maintaining symbol lock during a postgap following a data packet; and
      a loopback controller making a recovery instruction for recovering the normal mode from the loopback mode to the PHY during the postgap and after loopback and output of a data packet addressed to another node device are performed during the loopback mode,
   during the loopback mode, the PHY loops back an idle frame from an earlier node device to the later serial link for output,
   the PHY recovers the normal mode from the loopback mode in accordance with the recovery instruction with timing such that symbol lock is maintained between (i) the idle frame input from the earlier node device looped back for output to the later serial link during the loopback mode, and (ii) an idle frame output to the later serial link in accordance with the transmission instruction during the normal mode, and
   during the normal mode, the PHY outputs the idle frame to the later serial link in accordance with the transmission instruction from the symbol generator.

7. The node device of claim 6, wherein
the link controller hands over a data sequence pertaining to a control symbol set that begins with a comma symbol for symbol lock and that includes an idle symbol to the PHY as the transmission instruction,
the PHY outputs the idle frame during the normal mode through encoding of the data sequence pertaining to the control symbol set, and
the PHY recovers the normal mode from the loopback mode in accordance with the recovery instruction with timing such that (i) the idle frame from the earlier node device looped back for output to the later serial link during the loopback mode, and (ii) the idle frame output to the later serial link in accordance with the transmission instruction during the normal mode match in terms of comma symbol position and of running disparity.

8. The node device of claim 6, wherein
the link controller hands over a data sequence in which are bundled a plurality of idle symbols of predetermined word length to the PHY as the transmission instruction,
the PHY outputs the idle frame during the normal mode through encoding by (i) scrambling the data sequence according to a predetermined scrambling method and (ii) affixing a synchronization header to the head of each word of the predetermined word length for symbol lock, and
the PHY recovers the normal mode from the loopback mode in accordance with the recovery instruction with timing such that (i) the idle frame from the earlier node device looped back for output to the later serial link during the loopback mode, and (ii) the idle frame output to the later serial link in accordance with the transmission instruction during the normal mode match in terms of synchronization header position.

9. The node device of claim 6, wherein
the link controller hands over a data sequence pertaining to a control symbol set that begins with a comma symbol for symbol lock and that includes an idle symbol to the PHY as the transmission instruction,
the PHY includes:
   an encoder generating and outputting the idle frame to be output to the later serial link during the normal mode through encoding of the data sequence pertaining to the control symbol set; and
   a loopback selector selecting the idle frame output by the encoder for output to the later serial link during the normal mode, and selecting the idle frame from the earlier node device for output to the later serial link during the loopback mode,
the comma symbol of the idle frame is exclusively a type of symbol having an unequal number of zeroes and ones,
the idle symbol of the idle frame is a type of symbol having an unequal number of zeroes and ones, or is a type of symbol having an equal number of zeroes and ones,
when the comma symbol input from the earlier node device and the comma symbol input from the encoder match in terms of running disparity, the loopback selector switches output so as to recover the normal mode from the loopback mode immediately after the matching comma symbols,
when the comma symbol input from the earlier node device and the comma symbol input from the encoder do not match in terms of running disparity, and an idle symbol following the comma symbol input from the earlier node device and an idle symbol following the comma symbol input from the encoder do not match in terms of symbol type, the loopback selector switches output so as to recover the normal mode from the loopback mode immediately after the non-matching idle symbols, and
when the comma symbol input from the earlier node device and the comma symbol input from the encoder do not match in terms of running disparity, and the idle symbol following the comma symbol input from the earlier node device and the idle symbol following the comma symbol input from the encoder match in terms of symbol type, the loopback selector replaces the idle symbol following the comma symbol output from the earlier node device with a different type of symbol such that the running disparity remains as-is, and switches output so as to recover the normal mode from the loopback mode immediately after the matching idle symbols.

10. The node device of claim 6, wherein
at initialization time, the link controller sets a power saving control of the PHY as active or inactive, and
during a packet gap following the postgap,
   when the power saving control is active, the symbol generator makes a transmission disable instruction for placing the later serial link in an electrical idle state, and
   when the power saving control is inactive, the symbol generator makes another transmission instruction maintaining symbol lock.

11. The node device of claim 10, wherein
the link controller continues to output the idle frame to the later serial link in accordance with the transmission instruction until detecting, in the PHY, (i) an electrical idle state in the earlier serial link, or (ii) another idle frame.

12. The node device of claim 10, wherein
while looping back a data packet addressed to the other node device for output during the loopback mode, the link controller makes the recovery instruction upon detecting an end symbol of the data packet, and makes the recovery instruction upon detecting an electrical idle state of the earlier serial link or another idle frame symbol before detecting the end symbol.

13. An integrated circuit in a ring transmission system in which a plurality of integrated circuit are connected as a ring through serial links, comprising:
a link controller performing transmission, reception, and relay processing on a packet that includes destination information; and
a PHY switching a communication mode of operation between (i) a normal mode of performing interconversion between serial data input and output via the serial links and parallel data handled by the link controller, and (ii) a loopback mode of looping back the serial data input via an earlier serial link, before handover to the link controller, for output to a later serial link, wherein
the link controller includes:
a symbol generator making an idle frame transmission instruction for maintaining symbol lock to the PHY during a pregap between a transmission request packet and a data packet; and
a loopback controller making a transition instruction from the normal mode to the loopback mode to the PHY during the pregap and after the relay processing is performed in the normal mode on a transmission request packet addressed to another integrated circuit in order to cause a data packet addressed to the other integrated circuit to be looped back for output,
during the normal mode, the PHY outputs an idle frame to the later serial link in accordance with the transmission instruction from the symbol generator,
the PHY transitions from the normal mode to the loopback mode in accordance with the transition instruction with timing such that symbol lock is maintained between (i) the idle frame output to the later serial link in accordance with the transmission instruction during the normal mode, and (ii) an idle frame input from an earlier integrated circuit looped back for output to the later serial link during the loopback mode, and
during the loopback mode, the PHY loops back the idle frame from the earlier integrated circuit for output to the later serial link, and performs the relay processing on the data packet addressed to the other integrated circuit.

14. An integrated circuit in a ring transmission system in which a plurality of integrated circuits are connected as a ring through serial links, comprising:
a link controller performing transmission, reception, and relay processing on a packet that includes destination information; and
a PHY switching a communication mode of operation between (i) a normal mode of performing interconversion between serial data input and output via the serial links and parallel data handled by the link controller, and (ii) a loopback mode of looping back the serial data input via an earlier serial link before handover to the link controller for output to a later serial link, wherein
the link controller includes:
a symbol generator making an idle frame transmission instruction to the PHY for maintaining symbol lock during a postgap following a data packet; and
a loopback controller making a recovery instruction for recovering the normal mode from the loopback mode to the PHY during the postgap and after loopback and output of a data packet addressed to another integrated circuit are performed during the loopback mode,
during the loopback mode, the PHY loops back an idle frame from an earlier integrated circuit to the later serial link for output,
the PHY recovers the normal mode from the loopback mode in accordance with the recovery instruction with timing such that symbol lock is maintained between (i) the idle frame input from the earlier integrated circuit looped back for output to the later serial link during the loopback mode, and (ii) an idle frame output to the later serial link in accordance with the transmission instruction during the normal mode, and
during the normal mode, the PHY outputs the idle frame to the later serial link in accordance with the transmission instruction from the symbol generator.

15. A control method controlling a node device in a ring transmission system in which a plurality of node devices are connected as a ring through serial links, the node device comprising:
a link controller performing transmission, reception, and relay processing on a packet that includes destination information; and
a PHY switching a communication mode of operation between (i) a normal mode of performing interconversion between serial data input and output via the serial links and parallel data handled by the link controller, and (ii) a loopback mode of looping back the serial data input via an earlier serial link, before handover to the link controller, for output to a later serial link, wherein
the link controller performing:
a symbol generation step of making an idle frame transmission instruction for maintaining symbol lock to the PHY during a pregap between a transmission request packet and a data packet; and
a loopback control step of making a transition instruction from the normal mode to the loopback mode to the PHY during the pregap and after the relay processing is performed in the normal mode on a transmission request packet addressed to another node device in order to cause a data packet addressed to the other node device to be looped back for output,
during the normal mode, the PHY outputs an idle frame to the later serial link in accordance with the transmission instruction from the symbol generation step,
the PHY transitions from the normal mode to the loopback mode in accordance with the transition instruction with timing such that symbol lock is maintained between (i) the idle frame output to the later serial link in accordance with the transmission instruction during the normal mode, and (ii) an idle frame input from an earlier node device looped back for output to the later serial link during the loopback mode, and
during the loopback mode, the PHY loops back the idle frame from the earlier node device for output to the later serial link, and performs the relay processing on the data packet addressed to the other node device.

16. A control method controlling a node device in a ring transmission system in which a plurality of node devices are connected as a ring through serial links, the node device comprising:

a link controller performing transmission, reception, and relay processing on a packet that includes destination information; and a PHY switching a communication mode of operation between (i) a normal mode of performing interconversion between serial data input and output via the serial links and parallel data handled by the link controller, and (ii) a loopback mode of looping back the serial data input via an earlier serial link before handover to the link controller for output to a later serial link, wherein the link controller performing:
  a symbol generation step of making an idle frame transmission instruction to the PHY for maintaining symbol lock during a postgap following a data packet; and
  a loopback control step of making a recovery instruction for recovering the normal mode from the loopback mode to the PHY during the postgap and after loopback and output of a data packet addressed to another node device are performed during the loopback mode, during the loopback mode, the PHY loops back an idle frame from an earlier node device to the later serial link for output, the PHY recovers the normal mode from the loopback mode in accordance with the recovery instruction with timing such that symbol lock is maintained between (i) the idle frame input from the earlier node device looped back for output to the later serial link during the loopback mode, and (ii) an idle frame output to the later serial link in accordance with the transmission instruction during the normal mode, and during the normal mode, the PHY outputs the idle frame to the later serial link in accordance with the transmission instruction from the symbol generation step.

* * * * *